(12) United States Patent
Jeong

(10) Patent No.: US 10,785,842 B1
(45) Date of Patent: Sep. 22, 2020

(54) CIRCUIT FOR SUPPLYING POWER TO COMPONENTS OF LIGHTING APPARATUS, AND LIGHTING APPARATUS INCLUDING THE SAME

(71) Applicant: WELLANG CO., LTD., Gyeonggi-do (KR)

(72) Inventor: Dong Youl Jeong, Gyeonggi-do (KR)

(73) Assignee: WELLANG CO., LTD., Gyeonggi-do (KR)

( * ) Notice: Subject to any disclaimer, the term of this patent is extended or adjusted under 35 U.S.C. 154(b) by 0 days.

(21) Appl. No.: 16/634,678

(22) PCT Filed: Mar. 14, 2018

(86) PCT No.: PCT/KR2018/003009
§ 371 (c)(1),
(2) Date: Jan. 28, 2020

(87) PCT Pub. No.: WO2019/078425
PCT Pub. Date: Apr. 25, 2019

(30) Foreign Application Priority Data

Oct. 17, 2017 (KR) .................. 10-2017-0134813

(51) Int. Cl.
| | | |
|---|---|---|
| H05B 37/02 | (2006.01) |
| H05B 33/00 | (2006.01) |
| H05B 45/395 | (2020.01) |
| H05B 45/3725 | (2020.01) |
| H05B 45/20 | (2020.01) |
| H05B 33/08 | (2020.01) |
| H02M 1/08 | (2006.01) |

(52) U.S. Cl.
CPC ............ *H05B 45/395* (2020.01); *H02M 1/08* (2013.01); *H05B 33/08* (2013.01); *H05B 45/20* (2020.01); *H05B 45/3725* (2020.01)

(58) Field of Classification Search
None
See application file for complete search history.

(56) References Cited

U.S. PATENT DOCUMENTS 8,193,733 B2 * 6/2012 Su ..................... H05B 45/40
 315/291
8,390,214 B2 3/2013 Van Laanen et al.
(Continued)

FOREIGN PATENT DOCUMENTS

| KR | 10-2016-0115237 A | 10/2016 | |
|---|---|---|---|
| KR | 1020160115237 | 10/2016 | |
| WO | WO-2019078425 A1 * | 4/2019 | .............. H02M 1/44 |

OTHER PUBLICATIONS

International Search Report and Written Opinion for Application No. PCT/KR2018/003009 dated Jul. 13, 2018, 10 pages.

*Primary Examiner* — Vibol Tan
(74) *Attorney, Agent, or Firm* — Burris Law, PLLC

(57) ABSTRACT

Provided is an apparatus including a regulator circuit configured to generate at least one positive supply voltage from at least a portion of a light-emitting diode (LED) driving current passed through an LED to supply power to a component included in a lighting apparatus; and a converter circuit configured to receive a first control signal from the component and output a second control signal for controlling the LED driving current by converting the first control signal.

18 Claims, 27 Drawing Sheets

(56) References Cited

U.S. PATENT DOCUMENTS

| | | | |
|---|---|---|---|
| 8,975,825 B2 * | 3/2015 | Hu | H05B 45/39 |
| | | | 315/239 |
| 9,713,206 B2 * | 7/2017 | Melanson | H05B 45/48 |
| 9,974,129 B1 * | 5/2018 | Xiong | H05B 45/14 |
| 2008/0231198 A1 | 9/2008 | Zarr | |
| 2011/0043133 A1 | 2/2011 | Van Laanen et al. | |
| 2016/0302270 A1 | 10/2016 | Wang | |
| 2017/0215238 A1 | 7/2017 | Kim et al. | |

\* cited by examiner

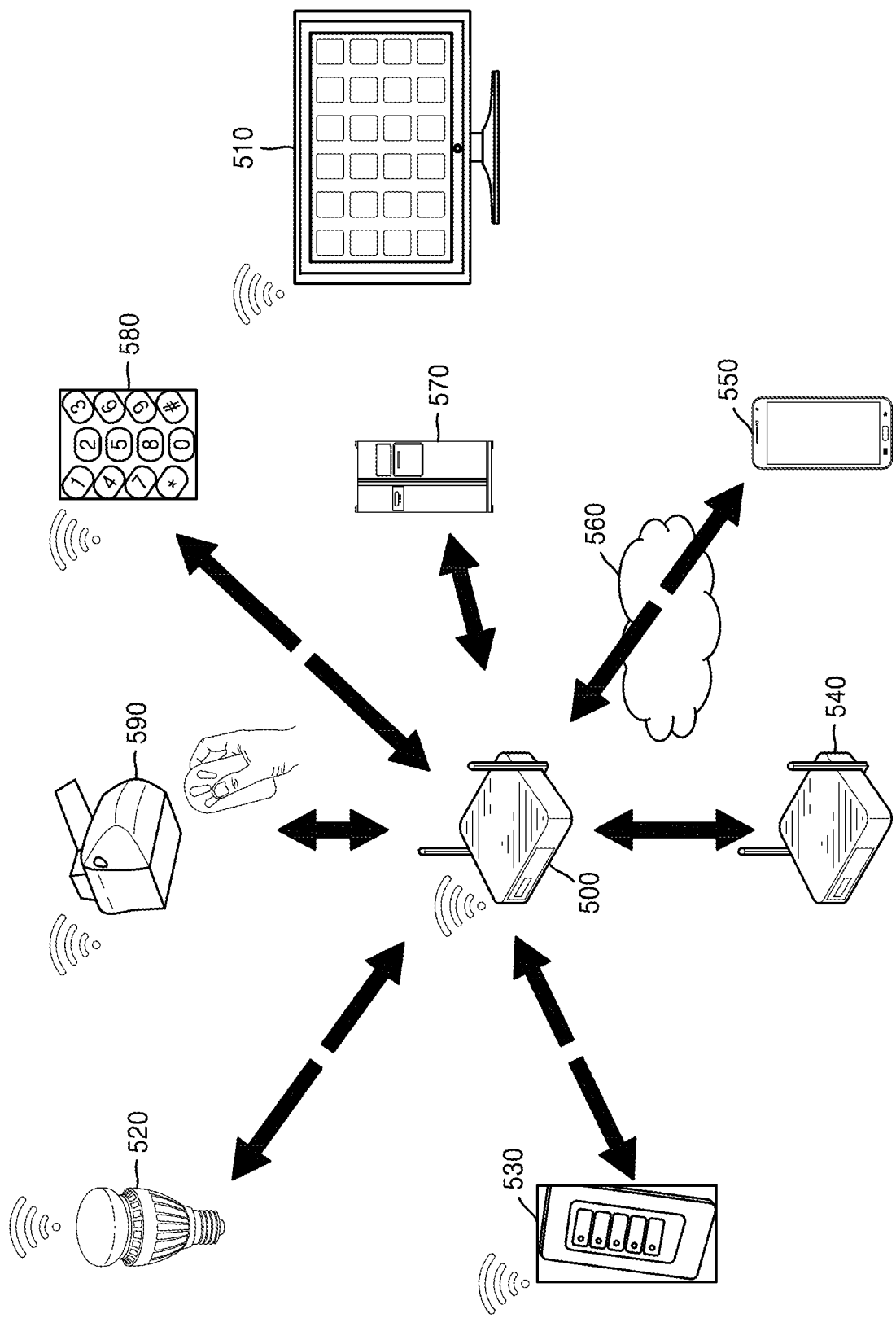

CIRCUIT FOR SUPPLYING POWER TO COMPONENTS OF LIGHTING APPARATUS, AND LIGHTING APPARATUS INCLUDING THE SAME

RELATED APPLICATIONS

The present application is a national stage application under 35 U.S.C. § 371 of International Application PCT/KR2018/003009, filed on Mar. 14, 2018, which claims priority to and the benefit of Korean Patent Application No. 10-2017-0134813 filed on Oct. 17, 2017. The entire content of the aforementioned applications are incorporated in their entirety herein by reference.

TECHNICAL FIELD

The disclosure relates to a power supply circuit, and more particularly, to a power supply circuit included in a lighting apparatus and a lighting apparatus including the power supply circuit.

BACKGROUND ART

Light-emitting diodes (LEDs) are being used in various applications because of their superior power consumption characteristic and smaller size than other light sources. Due to the characteristics of an LED of which light intensity depends on the magnitude of a current passing therethrough, a lighting apparatus using an AC voltage as a power source of an LED may include a component for converting the AC voltage. Furthermore, recently, a lighting apparatus may include peripheral components for performing operations such as brightness control, turning on/off, and color temperature control, in response to an external control or a surrounding environment. Since the power requirement for driving LEDs and the power requirement for driving peripheral components are different, a method of efficiently satisfying the power requirements of both is needed.

DESCRIPTION OF EMBODIMENTS

Technical Problem

The disclosure provides a circuit for efficiently supplying power to a peripheral component in a lighting apparatus including a light-emitting diode (LED) and a lighting apparatus including the circuit.

Solution to Problem

According to an aspect of the disclosure, there is provided an apparatus comprising a regulator circuit configured to generate at least one positive supply voltage from at least a portion of an LED driving current passed through a light emitting diode (LED) to supply power to components included in a lighting apparatus; and a converter circuit configured to receive a first control signal from the component and output a second control signal for controlling the LED driving current by converting the first control signal.

According to an example embodiment of the disclosure, the regulator circuit may include a shunt regulator that generates a first positive supply voltage from at least a part of the LED driving current.

According to an example embodiment of the disclosure, the apparatus may further include a dimming off detector configured to detect a dimming off state based on the first control signal or the second control signal; and a current supply circuit configured to provide a current generated from a full-wave rectified input voltage from an alternating current (AC) voltage to the regulator circuit, according to the detected dimming off state.

According to an example embodiment of the disclosure, according to the detected dimming off state, the shunt regulator may be turned off and a current provided by the current supply circuit may be provided to a node for outputting the first positive supply voltage.

According to an example embodiment of the disclosure, the regulator circuit may include a linear regulator configured to generate a second positive supply voltage from the first positive supply voltage.

According to an example embodiment of the disclosure, the regulator circuit may include a reference circuit configured to generate a reference signal provided to at least one of the shunt regulator and the linear regulator from the first positive supply voltage.

According to an example embodiment of the disclosure, the converter circuit may convert the first control signal having a variable voltage into the second control signal having one of a variable current, a variable voltage, and a variable light intensity.

According to an example embodiment of the disclosure, the converter circuit may output the second control signal at a certain level when the first control signal exceeds a preset upper bound.

According to an example embodiment of the disclosure, the converter circuit may output the second control signal at a certain level when the first control signal is below a preset lower bound.

According to an example embodiment of the disclosure, the apparatus may further include an LED driver configured to generate, from an input voltage, the LED driving current having a magnitude that follows the magnitude of the input voltage full-wave rectified from an AC voltage and to adjust the magnitude of the LED driving current based on the second control signal.

According to an example embodiment of the disclosure, the LED driver may include a current supply circuit configured to provide a supplementary current generated from the input voltage to the regulator circuit based on the second control signal.

According to an example embodiment of the disclosure, the apparatus may further include the component configured to receive power from the at least one positive supply voltage and to generate the first control signal from an external signal received from the outside of the lighting apparatus.

According to another aspect of the disclosure, there is provided a lighting apparatus configured to receive an alternating current (AC) voltage from the outside, the lighting apparatus including an LED array including at least one LED; an LED driver configured to provide an LED driving current to the LED array; a regulator circuit configured to generate at least one positive supply voltage from at least a portion of the LED driving current passed through the LED array; and a digital circuit configured to receive power from the at least one positive supply voltage.

According to an example embodiment of the disclosure, the component may generate a first control signal for controlling the lighting apparatus based on an external signal input from the outside of the lighting apparatus, the lighting apparatus may further include a converter circuit configured to output a second control signal for controlling the LED driving current by converting the first control signal, and the LED driver may adjust the LED driving current based on the second control signal.

According to an example embodiment of the disclosure, the LED array may include a plurality of LED sub-arrays including LEDs of different color temperatures, and the LED driver may adjust the LED driving current supplied to each of the plurality of LED sub-arrays based on the second control signal.

According to an example embodiment of the disclosure, the component may include an interface circuit configured to receive the external signal through a communication channel.

According to an example embodiment of the disclosure, the component may include a sensor configured to obtain the external signal from an environment outside the lighting apparatus.

Advantageous Effects of Disclosure

According to an example embodiment of the disclosure, a circuit for supplying power to a component included in a lighting apparatus and a lighting apparatus including the circuit may significantly reduce power consumption, space occupancy, cost, etc., due to an element for generating a positive supply voltage.

Furthermore, according to an example embodiment of the disclosure, a circuit for supplying power to a component included in a lighting apparatus and a lighting apparatus including the circuit may improve power efficiency for generating a positive supply voltage.

Furthermore, according to an example embodiment of the disclosure, a circuit for supplying power to a component included in a lighting apparatus and a lighting apparatus including the circuit may not only enables miniaturization the lighting apparatus, but also facilitate implementation of a lighting apparatus supporting various active operations.

The effects obtainable in the example embodiments of the disclosure are not limited to the above-mentioned effects, and other effects not mentioned above may be clearly derived and understood by one of ordinary skill in the art from the following descriptions. In other words, unintended effects of practicing example embodiments of the disclosure may also be derived by one of ordinary skilled in the art from the example embodiments of the disclosure.

BRIEF DESCRIPTION OF DRAWINGS

FIG. 21 is a diagram showing a home network including a lighting apparatus according to an example embodiment of the disclosure.

MODE OF DISCLOSURE

Figure 1A:
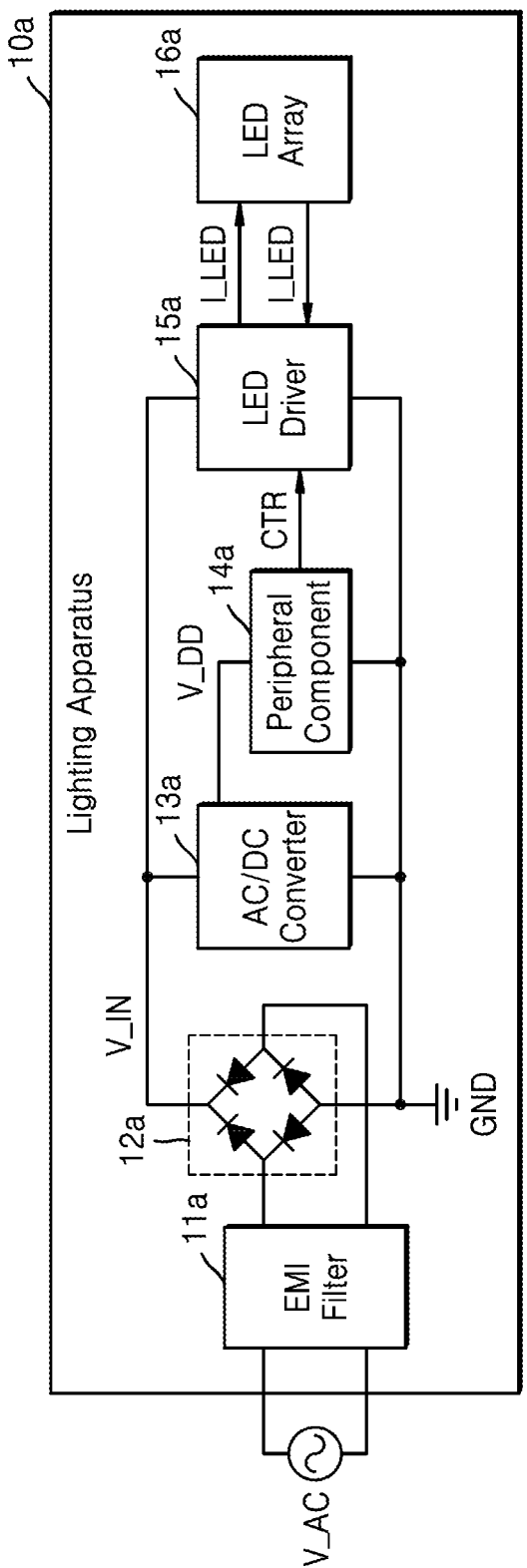
FIGS. 1A and 1B are block diagrams showing lighting apparatuses according to comparative examples of example embodiments of the disclosure.

Hereinafter, example embodiments will be described in detail with reference to the accompanying drawings. Example embodiments are provided to more fully explain the disclosure to one of ordinary skill in the art. The disclosure may include various embodiments and modifications, and embodiments thereof will be illustrated in the drawings and will be described herein in detail. However, this is not intended to limit the disclosure to particular modes of practice, and it is to be appreciated that all changes, equivalents, and substitutes that do not depart from the spirit and technical scope of the disclosure are encompassed in the disclosure. Like reference numerals are used for similar elements in describing each drawing. In the accompanying drawings, the dimensions of the structures are shown enlarged or reduced from the actual size for the sake of clarity of the inventive concept.

The terms used in the present specification are merely used to describe particular embodiments, and are not intended to limit the disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meaning as commonly understood by one of ordinary skill in the art to which the disclosure belongs. Terms identical to those defined in commonly used dictionaries should be interpreted as having a meaning consistent with the meaning in the context of the related art and are not to be interpreted as ideal or overly formal in meaning unless explicitly defined in the present application.

Figure 1B:
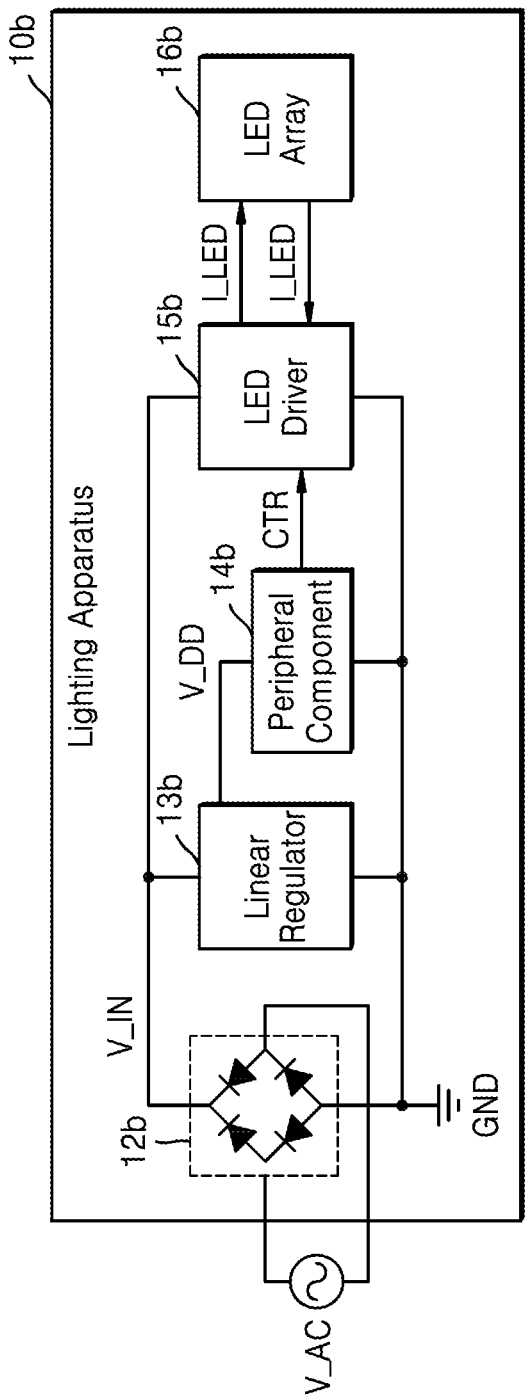

FIGS. 1A and 1B are block diagrams showing lighting apparatuses according to comparative examples of example embodiments of the disclosure. Lighting apparatuses 10a and 10b may include LED arrays 16a and 16b as light sources, and power may be supplied to the LED arrays 16a and 16b from an AC voltage V_AC. A lighting apparatus 10a of FIG. 1A may include an AC/DC converter 13a to provide a positive supply voltage V_DD to a peripheral component 14a, while a lighting apparatus 10b of FIG. 1B may include a linear regulator 13b to provide a positive supply voltage V_DD to a peripheral component 14b. Hereinafter, redundant descriptions of FIGS. 1A and 1B will be omitted.

Referring to FIG. 1A, the lighting apparatus 10a may include an EMI filter 11a, a full-wave rectifier 12a, the AC/DC converter 13a, the peripheral component 14a, an LED driver 15a, and an LED array 16a. The EMI filter 11a may receive the AC voltage V_AC and may remove a high frequency component due to a switching current generated from the AC/DC converter 13a. The full-wave rectifier 12a may generate an input voltage V_IN having a full-wave rectified potential with respect to a ground potential GND from the AC voltage V_AC, such as a sine wave. As shown in FIG. 1A, the input voltage V_IN generated by the full-wave rectifier 12a may be provided to the AC/DC converter 13a and the LED driver 15a.

The AC/DC converter 13a may generate the positive supply voltage V_DD for the peripheral component 14a from the input voltage V_IN. In order to generate the positive supply voltage V_DD, which is a direct voltage of several volts, the AC/DC converter 13a may include a transformer or an inductor, a large capacitor, a switch such as a power transistor, and a control integrated circuit for switching control. Accordingly, the AC/DC converter 13a may have a large volume and consequently limit the miniaturization of the lighting apparatus 10a, and the EMI filter 11a for the AC/DC converter 13a may also limit the miniaturization of the lighting apparatus 10a. Also, the AC/DC converter 13a generates the positive supply voltage V_DD of several volts (e.g., 5V, 3.3V, etc.) from the input voltage V_IN of tens to hundreds of volts (e.g., 220 Vrms), and thus the power efficiency of the AC/DC converter 13a may be low. For example, power lost due to low power efficiency may be converted into heat energy and released, thereby degrading the characteristics of the lighting apparatus 10a, and luminance per power (lm/W) as a specification of the lighting apparatus 10a may decrease.

The peripheral component 14a may receive power from the AC/DC converter 13a through the positive supply voltage V_DD, generate a control signal CTR, and transmit the generated control signal CTR to the LED driver 15a. For example, the peripheral component 14a may adjust the intensity of light emitted by the LED array 16a via the control signal CTR.

The LED driver 15a may generate an LED driving current I_LED from the input voltage V_IN and may provide the LED driving current I_LED to the LED array 16a including a plurality of LEDs. The LED driver 15a may adjust the LED driving current I_LED provided to the LED array 16a in response to the control signal CTR.

Referring to FIG. 1B, the lighting apparatus 10b may include a full-wave rectifier 12b, a linear regulator 13b, a peripheral component 14b, an LED driver 15b, and an LED array 16b. As shown in FIG. 1B, to provide the positive supply voltage V_DD to the peripheral component 14b, the linear regulator 13b may generate the positive supply voltage V_DD from the input voltage V_IN that is full-wave rectified from the AC voltage V_AC. Since the linear regulator 13b generates the positive supply voltage V_DD of several volts from the input voltage V_IN of tens to hundreds of volts, due to the power loss at the linear regulator 13b, the linear regulator 13b may provide significantly low power efficiency. Power loss occurring at the linear regulator 13b may be released as heat, thereby not only degrading the characteristics of the lighting apparatus 10b, but also causing malfunction or failure of the linear regulator 13b.

As described above with reference to FIGS. 1A and 1B, in the lighting apparatuses 10a and 10b including the peripheral components 14a and 14b, elements that generates the positive supply voltage V_DD from the input voltage V_IN, which is full-wave rectified from the AC voltage V_AC, or the AC voltage V_AC may degrade the characteristics of the lighting apparatuses 10a and 10b. Therefore, the inclusion of the peripheral components 14a and 14b in the lighting apparatus 10a and 10b may be limited, and as a result, the implementation of the lighting apparatuses 10a and 10b that provide various functions may be limited.

As will be described below with reference to the drawings, a circuit for supplying power to peripheral circuits and an apparatus including the same according to example embodiments of the disclosure may significantly reduce heat generation, space occupancy, and cost due to components for generating a positive supply voltage to be provided to the peripheral circuits. Also, a circuit for supplying power to peripheral circuits and an apparatus including the same according to example embodiments of the disclosure may improve the power efficiency for generating a positive supply voltage, miniaturize a lighting apparatus, and facilitate the implementation of a lighting apparatus supporting various active operations.

Figure 2:
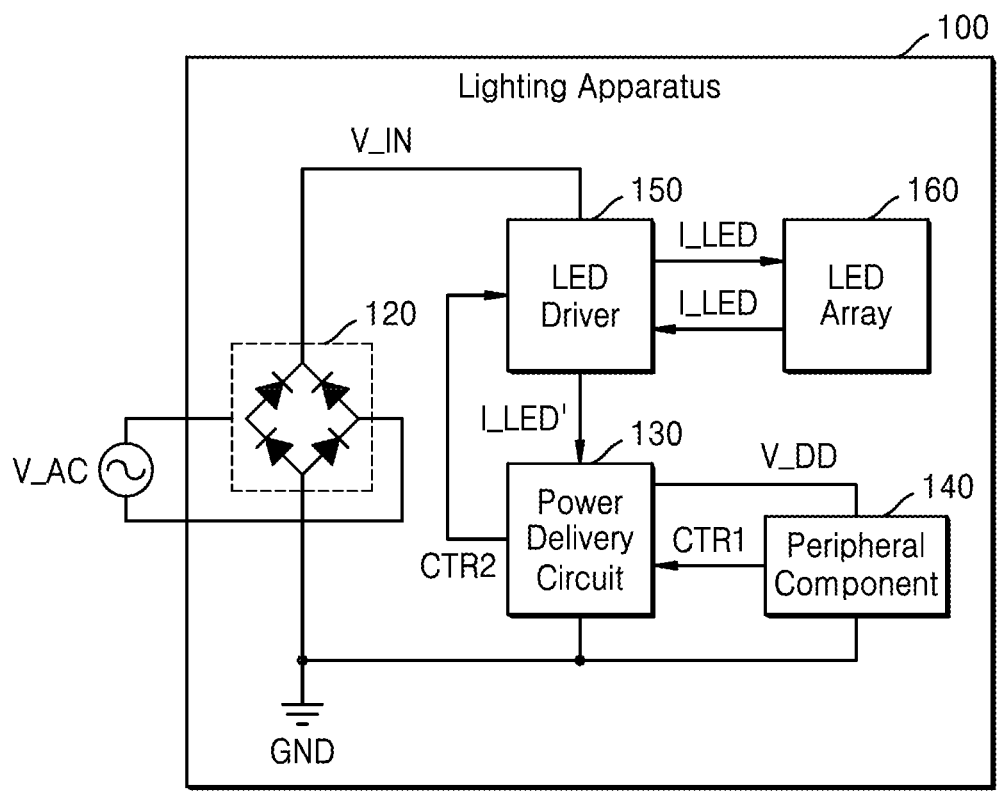
FIG. 2 is a block diagram showing a lighting apparatus according to an example embodiment of the disclosure.

FIG. 2 is a block diagram showing a lighting apparatus 100 according to an example embodiment of the disclosure.

The lighting apparatus 100 may include an LED array 160 as a light source, and as a non-limiting example, may be included in a lamp for indoor lighting, outdoor lighting, portable lighting, vehicle lighting, etc. In some embodiments, the lighting apparatuses 10a and 10b may be independently distributed units and may be removed from lamps. As shown in FIG. 2, the lighting apparatus 100 may receive power from the AC voltage V_AC and may include a full-wave rectifier 120, a power delivery circuit 130, a peripheral component 140, an LED driver 150, and the LED array 160. In some embodiments, two or more elements included in the lighting apparatus 100 may be included in one semiconductor package. For example, the power delivery circuit 130, the peripheral component 140, and the LED driver 150 may be included in one semiconductor package, two or more from the power delivery circuit 130, the peripheral component 140, and the LED driver 150 may be included in one semiconductor package, or the power delivery circuit 130, the peripheral component 140, and the LED driver 150 may be respectively included in different semiconductor packages.

The full-wave rectifier 120 may generate the input voltage V_IN having a full-wave rectified potential with respect to the ground potential GND from the AC voltage V_AC, such as a sine wave. As shown in FIG. 2, the input voltage V_IN may be provided to the LED driver 150, and the power delivery circuit 130 and the peripheral component 140 may be connected to the ground potential GND.

The LED array 160 may include at least one LED and may be configured as at least one LED string including serially connected LEDs. In some embodiments, the LED array 160 may include at least one LED having substantially the same color temperature and may also include a plurality of LEDs each having two or more different color temperatures. Each of LED strings included in the LED array 160 may receive at least a part of the LED driving current I_LED, and the intensity of emitted light may be determined according to the amount of current passing through a corresponding LED string.

The LED driver 150 may generate the LED driving current I_LED from the input voltage V_IN and provide the LED driving current I_LED to the LED array 160. Also, as shown in FIG. 2, the LED driver 150 may receive the LED driving current I_LED that passed through the LED array 160. The LED driver 150 may provide at least a portion I_LED' of the LED driving current I_LED to the power delivery circuit 130. In some embodiments, the current I_LED' may be substantially the same as the LED driving current I_LED. In some embodiments, the current I_LED' may coincide with currents passed through some LED strings, e.g., some LED sub-arrays, of the LED array 160. As described below, the positive supply voltage V_DD of the peripheral component 140 may be generated from at least the portion I_LED' of the LED driving current I_LED provided to the power delivery circuit 130. Also, the LED driver 150 may adjust the LED current I_LED based on a second control signal CTR2 received from the power delivery circuit 130. Examples of the LED driver 150 will be described below with reference to FIGS. 8A, 8B, 9, and 11.

The power delivery circuit 130 may receive at least a portion I_LED' of the LED driving current I_LED from the LED driver 150, generate the positive supply voltage V_DD from the current I_LED', and generate the positive supply voltage V_DD to the peripheral component 140. In other words, as the power source of the peripheral components 140, the positive supply voltage V_DD may be generated from at least the part I_LED' of the LED driving currents I_LED used by the LED array 160 to emit light instead of being generated directly from the input voltage V_IN. A node through which the current I_LED' moves from the LED driver 150 to the power delivery circuit 130 may have a voltage decreased from the input voltage V_IN based on to a voltage drop due to the LED driver 150 and the LED array 160. Therefore, as described above with reference to FIGS. 1A and 1B, to generate the positive supply voltage V_DD from the input voltage V_IN, the positive supply voltage V_DD for the peripheral component 140 may be easily generated without using components inferior in terms of volume, heat generation, and power efficiency (e.g., 13a of FIG. 1A and 13b of FIG. 1B).

As shown in FIG. 2, the power delivery circuit 130 may receive a first control signal CTR1 for controlling the lighting apparatus 100 from the peripheral components 140 and may generate and provide the second control signal CTR2 for controlling the LED driving current I_LED to the LED driver 150 by converting the first control signal CTR1. The first control signal CTR1 output from the peripheral component 140 may have a voltage between the positive supply voltage V_DD and the ground potential GND, and thus the power delivery circuit 130 may generate the second control signal CTR2 that may be detected by the LED driver 150 by converting the first control signal CTR1. Examples of the power delivery circuit 130 will be described below with reference to FIG. 3.

The peripheral component 140 may operate based on power provided by the positive supply voltage V_DD and may generate the first control signal CTR1. For example, the peripheral component 140 may include digital and/or analog circuit(s) that receive(s) the positive supply voltage V_DD.

In some embodiments, the peripheral component 140 may generate the first control signal CTR1 based on an external signal received via a wired or wireless communication channel with an external device. For example, the peripheral components 140 may include, as a non-limiting example, a module for a communication via a wire, such as a universal serial bus (USB), a power line communication (PLC), or the like, and may include, as a non-limiting example, a module for a wireless communication such as Bluetooth, ZigBee, TV white space (TVWS), Wi-Fi, or the like. A communication module included in the peripheral component 140 may operate by the positive supply voltage V_DD, and the first control signal CTR1 may be generated based on a command received from the outside through a communication channel.

In some embodiments, the peripheral component 140 may generate the first control signal CTR1 by sensing the environment outside the lighting apparatus 100. For example, the peripheral component 140 may include, as a non-limiting example, a sensor that converts a sensed external signal into an electrical signal, such as a temperature sensor, an luminance sensor, a motion sensor, an infrared sensor, a microphone, and the like, and the first control signal CTR1 may be generated based on an output signal of the sensor.

In some embodiments, the peripheral component 140 may generate the first control signal CTR1 internally. For example, the peripheral component 140 may include, as a non-limiting example, a timer and may generate the first control signal CTR1 based on an output of the timer.

Figure 3:
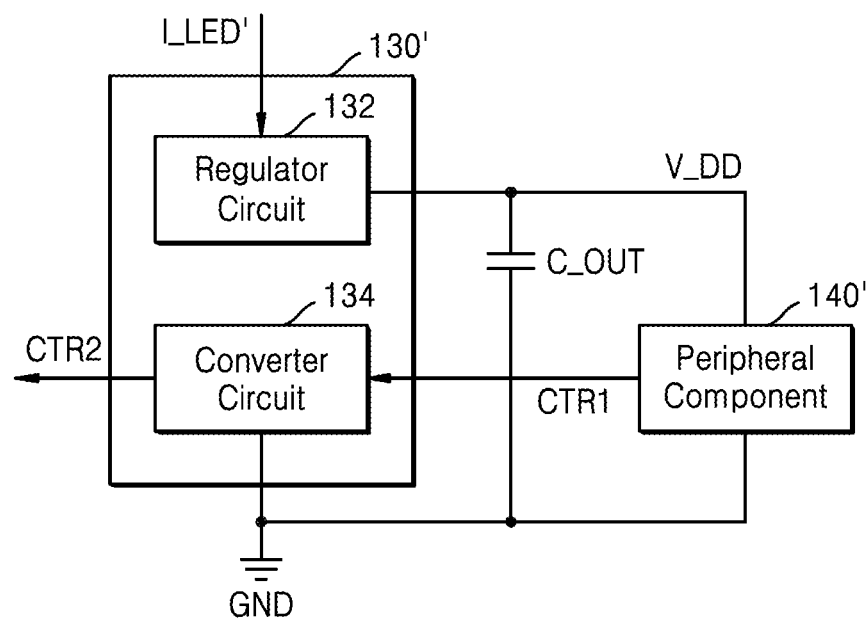
FIG. 3 is a block diagram showing examples of a power delivery circuit and a peripheral component of FIG. 2 according to an example embodiment of the disclosure.

FIG. 3 is a block diagram showing examples of the power delivery circuit 130 and the peripheral component 140 of FIG. 2 according to an example embodiment of the disclosure. As shown in FIG. 3, a power delivery circuit 130' may provide the positive supply voltage V_DD to a peripheral component 140', and the peripheral component 140' may provide the first control signal CTR1 to the power delivery circuit 130'. Hereinafter, FIG. 3 will be described with reference to FIG. 2.

Referring to FIG. 3, the power delivery circuit 130' may include a regulator circuit 132 and a converter circuit 134.

The regulator circuit 132 may generate the positive supply voltage V_DD from the current I_LED' provided from the LED driver 150 of FIG. 2. As shown in FIG. 3, a capacitor C_OUT may be provided between a node, through which the positive supply voltage V_DD is transmitted from the regulator circuit 132 to the peripheral component 140', and the ground potential GND, and the capacitor C_OUT may provide an instantaneous load current occurring in the peripheral component 140'. An example of the regulator circuit 132 will be described below with reference to FIG. 4.

The converter circuit 134 may generate the second control signal CTR2 by converting the first control signal CTR1, and provide the second control signal CTR2 to the LED driver 150 of FIG. 2. In some embodiments, the converter circuit 134 may generate the second control signal CTR2 having a variable voltage or a variable current by converting the first control signal CTR1 having a variable voltage. In other words, the converter circuit 134 may serve as a voltage-voltage converter or a voltage-current converter. On the other hand, the converter circuit 134 may generate the second control signal CTR2, which is a non-electrical signal (e.g., an optical signal), by converting the first control signal CTR1, which is an electrical signal. An example of the converter circuit 134 will be described below with reference to FIG. 6.

Figure 4:
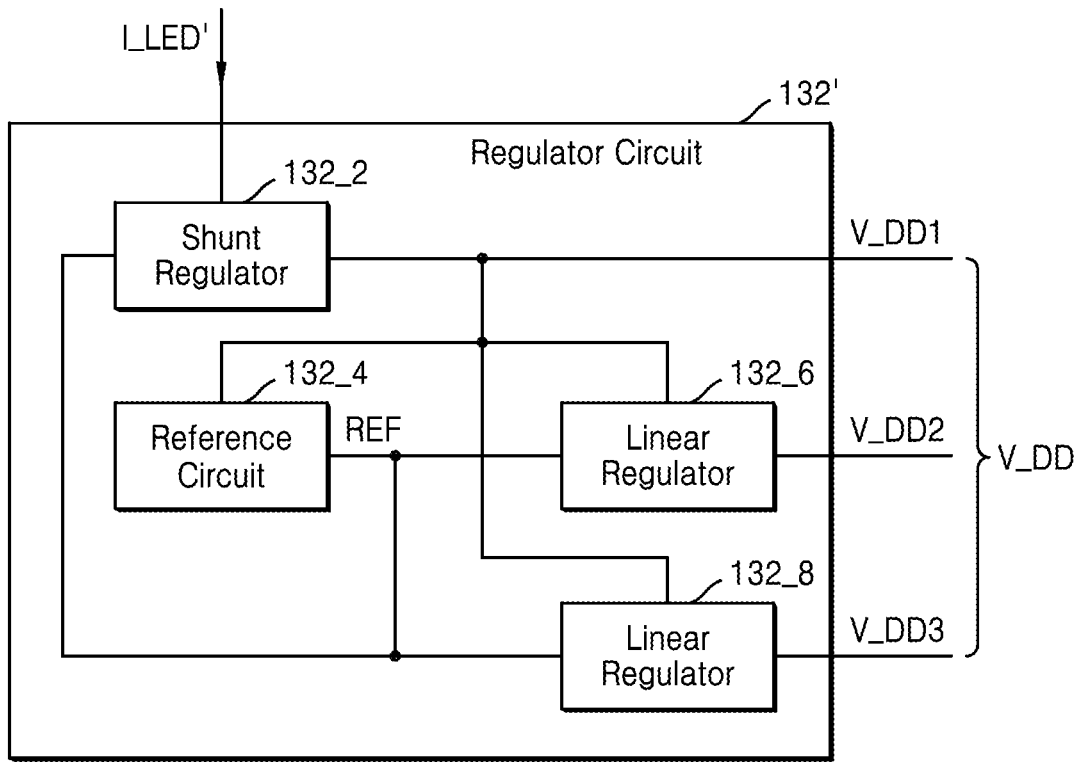
FIG. 4 is a block diagram showing an example of a regulator circuit of FIG. 3 according to an example embodiment of the disclosure.

FIG. 4 is a block diagram showing an example of the regulator circuit 132 of FIG. 3 according to an example embodiment of the disclosure. As described above with reference to FIG. 3, a regulator circuit 132' of FIG. 4 may generate the positive supply voltage V_DD from the current I_LED' provided from the LED driver 150 of FIG. 2. As shown in FIG. 4, the regulator circuit 132' may generate a plurality of positive supply voltages V_DD1, V_DD2, and V_DD3 and may include a shunt regulator 132_2, a reference circuit 132_4, and linear regulators 132_6 and 132_8. Although FIG. 4 shows an example in which the regulator circuit 132' includes two linear regulators 132_6 and 132_8, a regulator circuit may include one linear regulator, may include or three or more linear regulators, or may include no linear regulator according to example embodiments of the disclosure.

The shunt regulator 132_2 may adjust the supply of a current to a load to maintain a first positive supply voltage V_DD1 constant. In other words, the shunt regulator 132_2 may provide the first positive supply voltage V_DD1 by adjusting the magnitude of current which flows as a portion of the current I_LED' toward the ground potential GND. As shown in FIG. 4, the first positive supply voltage V_DD1 generated by the shunt regulator 132_2 may be provided to other components of the regulator circuit 132'. Therefore, the shunt regulator 132_2 may be referred to as a master regulator, and the linear regulators 132_6 and 132_8 may be referred to as slave regulators. Examples of the shunt regulator 132_2 will be described below with reference to FIGS. 5A to 5C.

The reference circuit 132_4 may generate a reference signal REF from the first positive supply voltage V_DD1. In some embodiments, the reference signal REF may be a reference current having a preset magnitude. In some embodiments, the reference signal REF may be a reference voltage having a preset magnitude. In some embodiments, the reference circuit 132_4 may generate both a reference current and a reference voltage. As shown in FIG. 4, the reference signal REF may be provided to other regulators, that is, the shunt regulator 132_2 and the linear regulators 132_6 and 132_8.

In some embodiments, the reference circuit 132_4 may receive the input voltage V_IN of FIG. 2. For example, when the magnitude of the first positive supply voltage V_DD1 is not sufficient to generate the reference signal REF, the reference circuit 132_4 may generate the reference signal REF from the input voltage V_IN.

The linear regulators 132_6 and 132_8 may receive the first positive supply voltage V_DD1 and the reference signal REF and generate positive supply voltages V_DD2 and V_DD3. In other words, the first linear regulator 132_6 may generate a second positive supply voltage V_DD2, and the second linear regulator 132_8 may generate a third positive supply voltage V_DD3. The linear regulators 132_6 and 132_8 may have high efficiency of generating second and third positive supply voltages V_DD2 and V_DD3 from the first positive supply voltage V_DD1 of several volts provided by the shunt regulator 132_2.

Figure 5A:
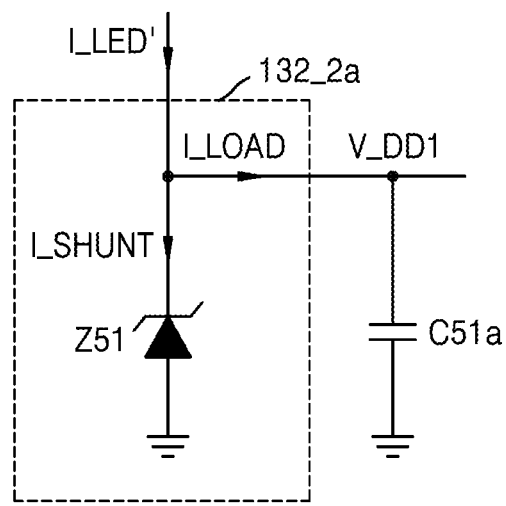
FIGS. 5A to 5C are circuit diagrams showing examples of a shunt regulator of FIG. 4 according to example embodiments of the disclosure.
Figure 5B:
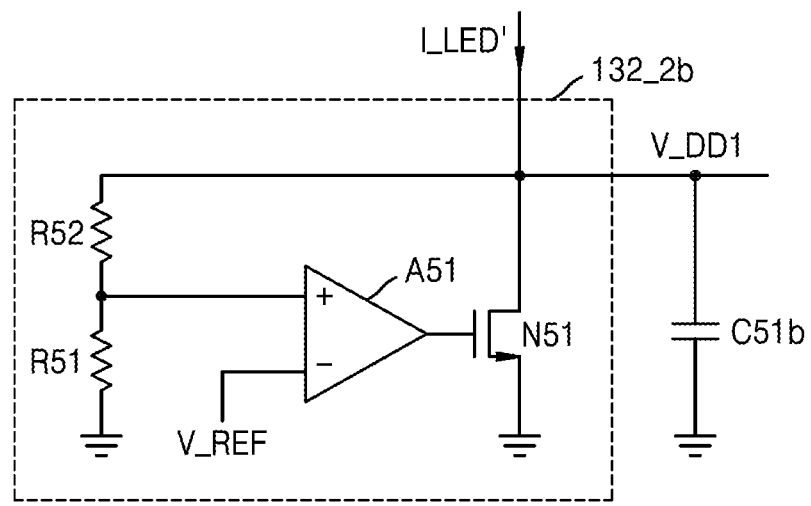
Figure 5C:
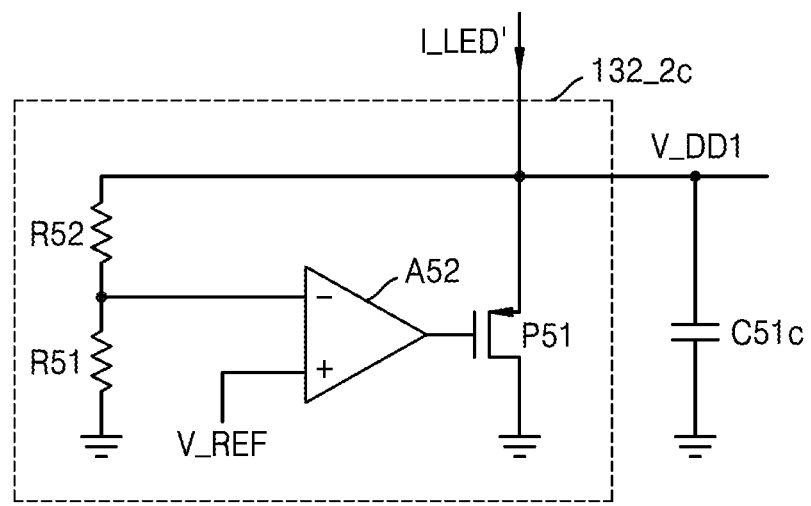

FIGS. 5A to 5C are circuit diagrams showing examples of the shunt regulator 132_2 of FIG. 4 according to example embodiments of the disclosure. As described above with reference to FIG. 4, shunt regulators 132_2a, 132_2b, and 132_2c of FIGS. 5A to 5C may generate the first positive supply voltage V_DD1 from the current I_LED' provided from the LED driver 150 of FIG. 2. The shunt regulators 132_2a, 132_2b, and 132_2c of FIGS. 5A to 5C are merely examples, and it will be understood that a shunt regulator having a different structure from those of the shunt regulators 132_2a, 132_2b, and 132_2c may be used.

Referring to FIG. 5A, the shunt regulator 132_2a may include a zener diode Z51. Therefore, the first positive supply voltage V_DD1 may substantially match the breakdown voltage of the zener diode Z51. In other words, as shown in FIG. 5A, the current I_LED' may be branched into a load current I_LOAD and a shunt current I_SHUNT. In the zener diode Z51, when the load current I_LOAD increases, the shunt current I_SHUNT may decrease as much as the increase of the load current I_LOAD, and thus the first positive supply voltage V_DD1 may be maintained constant. In the same regard, when the load current I_LOAD decreases, the shunt current I_SHUNT may increase as much as the decrease of the load current I_LOAD, and thus the first positive supply voltage V_DD1 may be maintained constant. As shown in FIG. 5A, a capacitor C51a may be connected to an output node of a shunt regulator 132_2a, that is, a node that outputs the first positive supply voltage V_DD1.

Referring to FIG. 5B, a shunt regulator 132_2b may include an operational amplifier A51, an NMOS transistor N51, and resistors R51 and R52. Therefore, the first positive supply voltage V_DD1 may be determined as shown in [Equation 1] below.

$$\text{V\_DD1} = \left(1 + \frac{R52}{R51}\right) \cdot \text{V\_REF} \qquad \text{[Equation 1]}$$

The first positive supply voltage V_DD1 may be determined by the reference voltage V_REF and the resistors R51 and R52 according to [Equation 1]. In some embodiments, the reference voltage V_REF may be provided from the reference circuit 132_4 of FIG. 4. In some embodiments, the reference voltage V_REF may be generated inside the shunt regulator 132_2b. Also, in some embodiments, a bipolar npn transistor may be used instead of the NMOS transistor N51. Similar to the shunt regulator 132_2a of FIG. 5A, a capacitor C51b may be connected to an output node of the shunt regulator 132_2b, that is, a node that outputs the first positive supply voltage V_DD1.

Referring to FIG. 5C, a shunt regulator 132_2c may include an operational amplifier A52, a PMOS transistor P51, and the resistors R51 and R52. Accordingly, the first positive supply voltage V_DD1 may be determined by the reference voltage V_REF and the resistors R51 and R52 as shown in [Equation 1] above. In some embodiments, the reference voltage V_REF may be provided from the reference circuit 132_4 of FIG. 4. In some embodiments, the reference voltage V_REF may be generated inside the shunt regulator 132_2c. Also, in some embodiments, a bipolar pnp transistor may be used instead of the PMOS transistor P51. Similar to the shunt regulator 132_2a of FIG. 5A, a capacitor C51c may be connected to an output node of the shunt regulator 132_2c, that is, a node that outputs the first positive supply voltage V_DD1.

Referring to FIGS. 5B and 5C, the shunt regulators 132_2b and 132_2c are controlled by the operational amplifiers A51 and A52, such that the current of the NMOS transistor N51 or the PMOS transistors P51 decreases or increases as the load current increases or decreases. Therefore, the first positive supply voltage V_DD1 may be determined as shown in [Equation 1].

Figure 6:
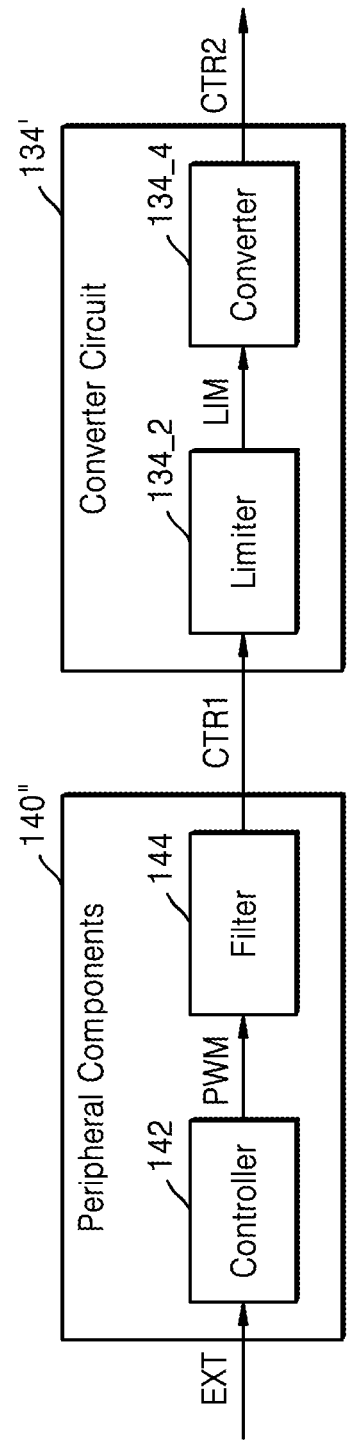
FIG. 6 is a block diagram showing examples of peripheral components and a converter circuit of FIG. 3 according to an example embodiment of the disclosure.

FIG. 6 is a block diagram showing examples of the peripheral components 140' and the converter circuit 134 of FIG. 3 according to an example embodiment of the disclosure. As described above with reference to FIG. 3, a peripheral component 140" of FIG. 6 may generate the first control signal CTR1 from an external signal EXT, and the converter circuit 134' may generate the second control signal CTR2 from the first control signal CTR1.

Referring to FIG. 6, the peripheral components 140" may include a controller 142 and a filter 144. The controller 142 may receive the external signal EXT generated outside the lighting apparatus 100 of FIG. 2 and generate a pulse width modulation (PWM) signal PWM from the external signal EXT. For example, the controller 142 may generate a PWM signal PWM for adjusting the intensity of light emitted by the lighting apparatus 100 in response to the external signal EXT, and a positive pulse width or a negative pulse width of the PWM signal PWM may increase in proportion to the light intensity.

The filter 144 may generate the first control signal CTR1 by filtering the PWM signal PWM. For example, the filter 144 may low-pass filter the PWM signal PWM, thereby generating the first control signal CTR1 having a voltage proportional to the positive pulse width of the PWM signal PWM. The filter 144 may, in some embodiments, include passive devices such as resistors and capacitors.

Also, in some embodiments, the controller 142 may generate an analog signal for adjusting the intensity of light emitted by the lighting apparatus 100 in response to the external signal EXT, wherein the analog signal may increase in proportion to the intensity of the light. In this case, the filter 144 may be omitted.

Referring to FIG. 6, a converter circuit 134' may include a limiter 134_2 and a converter 134_4. The limiter 134_2 may generate a limited signal LIM by limiting the first control signal CTR1 to a preset range. For example, the limiter 134_2 may have a preset upper bound and/or a preset lower bound according to a variable range of brightness and may generate the limited signal LIM by comparing the first control signal CTR1 with the upper bound and/or the lower bound. Example operations of the limiter 134_2 will be described below with reference to FIGS. 7A to 7C.

The converter 134_4 may generate the second control signal CTR2 by converting the limited signal LIM. In some embodiments, the first control signal CTR1 and the limited signal LIM may have voltages that varies according to information contained therein, and the converter 134_4 may generate the second control signal CTR2 having a variable current from the limited signal LIM having a variable voltage. In other words, converter 134_4 may function as a voltage-current converter. As described above with reference to FIG. 2, the second control signal CTR2 may be provided to the LED driver 150, and the LED driver 150 may have a reference potential different from that of the peripheral components 140. Therefore, the limited signal LIM may be converted by the converter 134_4, such that the signal CTR2 has a variable current.

In some embodiments, the first control signal CTR1 and the limited signal LIM may have voltages that varies according to information contained therein, and the converter 134_4 may generate the second control signal CTR2 having a variable voltage based on the positive supply voltage V_DD from the limited signal LIM having a variable voltage. In other words, converter 134_4 may function as a voltage-voltage converter. As described above with reference to FIG. 2, the second control signal CTR2 may be provided to the LED driver 150, and the LED driver 150 may have a reference potential different from that of the peripheral components 140. Therefore, the limited signal LIM may be converted by the converter 134_4, such that the signal CTR2 has a variable voltage.

Figure 7A:
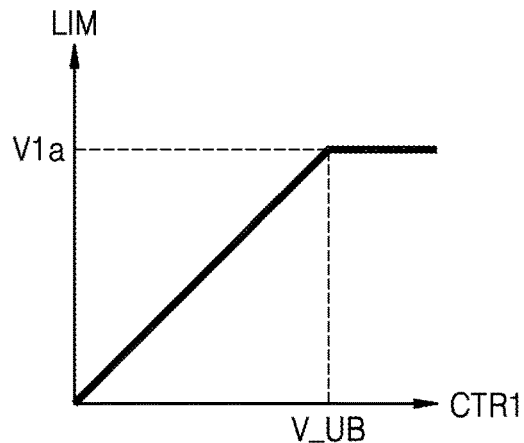
FIGS. 7A to 7C are graphs showing examples of the operation of a limiter of FIG. 6 according to example embodiments of the disclosure.
Figure 7B:
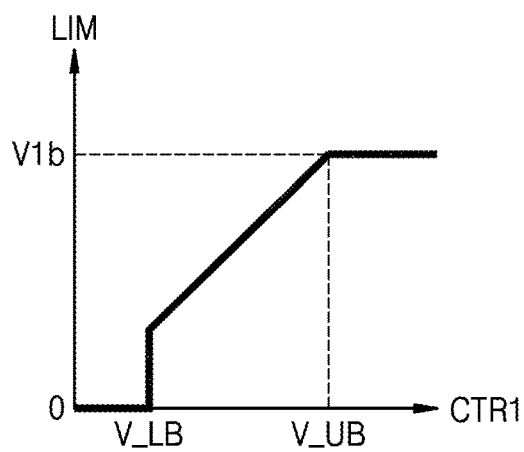
Figure 7C:
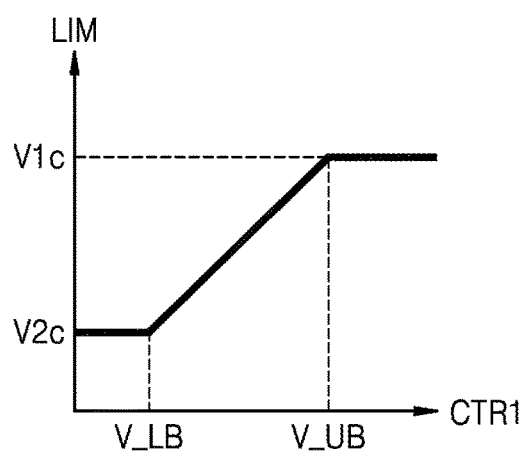

FIGS. 7A to 7C are graphs showing examples of the operation of a limiter 134_2 of FIG. 6 according to example embodiments of the disclosure. As described above with reference to FIG. 6, the limiter 134_2 may generate the limited signal LIM by limiting the first control signal CTR1 based on a preset upper bound and/or a preset lower bound. In FIGS. 7A to 7C, it is assumed that the first control signal CTR1 and the limited signal LIM have variable voltages, and the horizontal axis and the vertical axis of the graphs indicate the magnitudes of voltages.

Referring to FIG. 7A, the limiter 134_2 may have an upper bound V_UB and may generate the limited signal LIM having a constant voltage V1a when the magnitude of the first control signal CTR1 exceeds the upper bound V_UB. The upper bound V_UB may be determined based on a range of the second control signal CTR2 that may be acceptable by the LED driver 150 of FIG. 2.

Referring to FIG. 7B, the limiter 134_2 may have the upper bound V_UB and a lower bound V_LB, may generate the limited signal LIM having a constant voltage V1b when the magnitude of the first control signal CTR1 exceeds the upper bound V_UB, and may generate the limited signal LIM having an approximately zero magnitude when the magnitude of the first control signal CTR1 is smaller than the lower bound V_LB. In other words, when the magnitude of the first control signal CTR1 is smaller than the preset lower bound V_LB, the limiter 134_2 may generate a limited signal LIM having an approximately zero magnitude, such that the lighting apparatus 100 of FIG. 2 is turned off, that is, no light is emitted from the LED array 160.

Referring to FIG. 7C, the limiter 134_2 may have the upper bound V_UB and the lower bound V_LB, may generate the limited signal LIM having a constant voltage V1c when the magnitude of the first control signal CTR1 exceeds the upper bound V_UB, and may generate the limited signal LIM having a constant voltage V2c when the magnitude of the first control signal CTR1 is lower than the lower bound V_LB. In other words, unlike in the example of FIG. 7B, when the magnitude of the first control signal CTR1 is smaller than the preset lower bound V_LB, the limiter 134_2 may generate the limited signal LIM having the constant voltage V2c, such that light of a constant intensity is emitted from the LED array 160 of FIG. 2.

In some embodiments, the limiter 134_2 of the converter circuit 134' may be omitted. Referring to FIG. 2, the LED driver 150 may include a limiter that operates similarly as the limiter 134_2. Also, the converter circuit 134' may provide the second control signal CTR2 to the LED driver 150 by only converting the first control signal CTR1 without limitations of an upper bound and a lower bound. In some embodiments, the functions of the limiter 134_2 to limit the lower bound and the upper bound of the first control signal CTR1 may be implemented separately in the converter circuit 134' and the LED driver 150, respectively. For example, the first control signal CTR1 having a smaller magnitude than a preset lower bound may be processed by the converter circuit 134', and the second control signal CTR2 having a magnitude larger than a preset upper bound may be processed by the LED driver 150.

In some embodiments, the converter circuit 134' may further include a dimming off detector. For example, the converter circuit 134' may further include a dimming off detector that performs an operation similar to that of a dimming off detector 151 of FIG. 11. An example of the dimming off detector will be described below with reference to FIG.

Figure 8A:
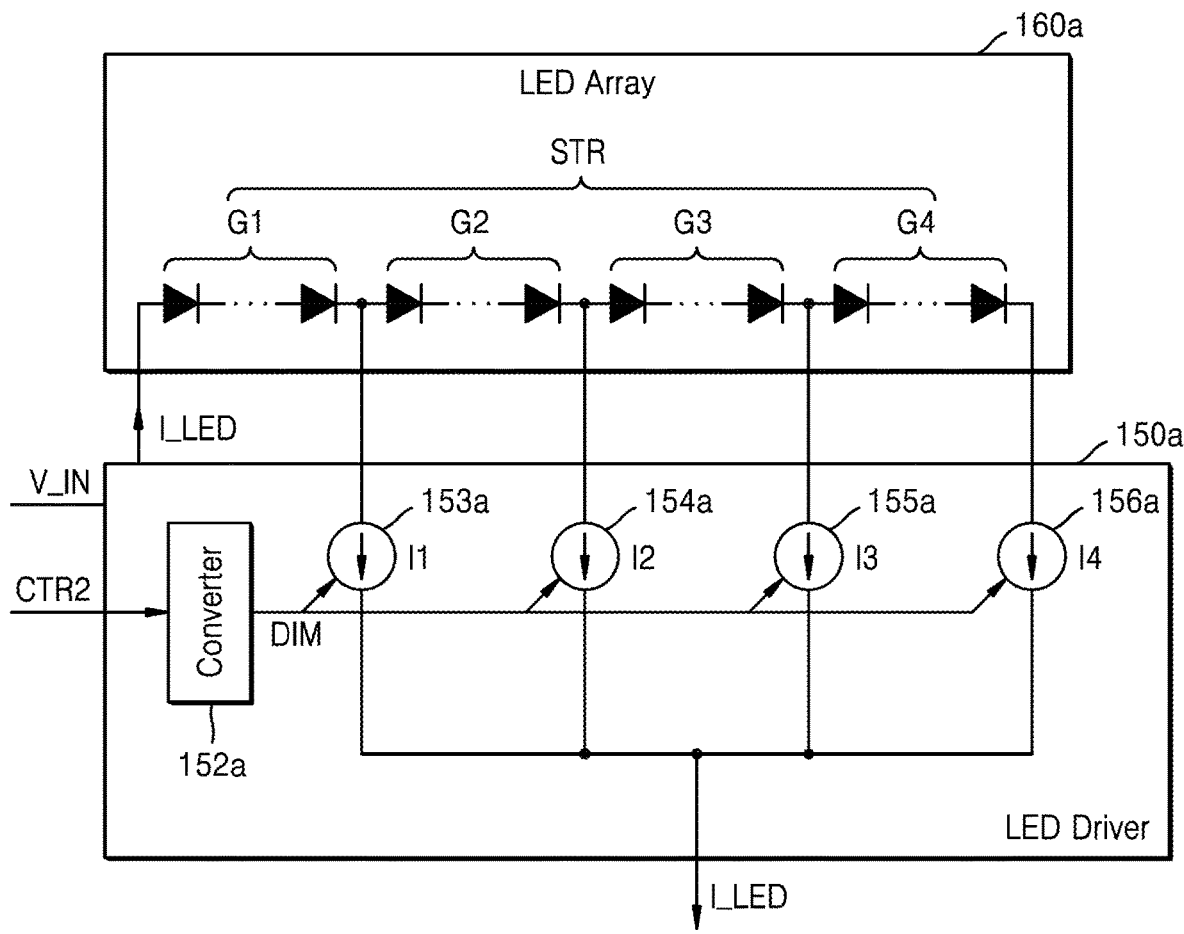
FIG. 8A is a diagram showing an example of an LED driver of FIG. 2 according to an example embodiment of the disclosure.
Figure 8B:
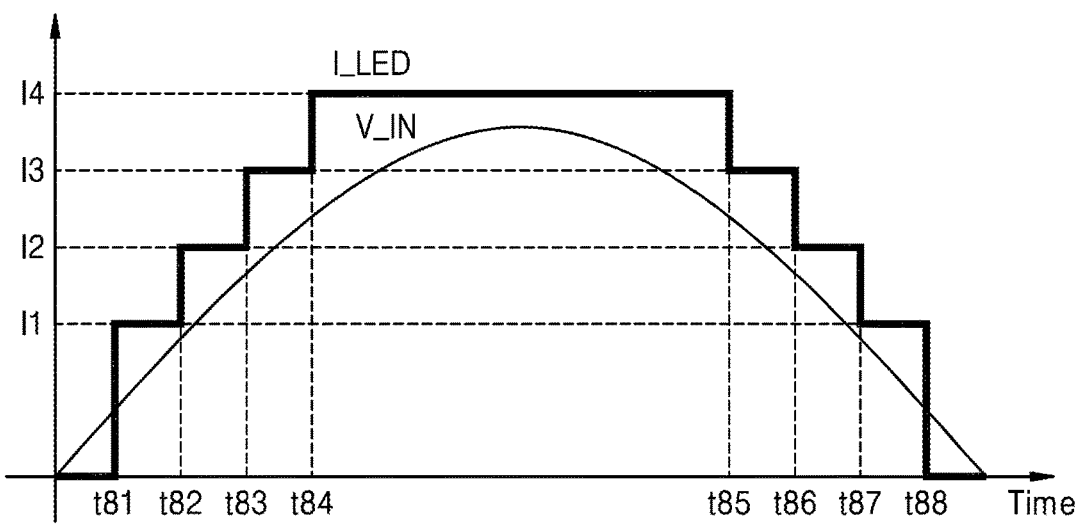
FIG. 8B is a diagram showing an example of the operation of an LED driver of FIG. 8A according to an example embodiment of the disclosure.

FIG. 8A is a diagram showing an example of the LED driver 150 of FIG. 2 according to an example embodiment of the disclosure, and FIG. 8B is a diagram showing an example of the operation of the LED driver 150a of FIG. 8A according to an example embodiment of the disclosure. As shown in FIG. 8A, the LED driver 150a may receive the input voltage V_IN and the second control signal CTR2 and may provide the LED driving current I_LED to the LED array 160a. In some embodiments, the LED driver 150a may provide the input voltage V_IN to the LED array 160a and may adjust the LED driving current I_LED.

The LED array 160a may include an LED string STR including a plurality of LEDs connected in series. The LED string STR may include a plurality of LED groups G1 to G4. The LED groups G1 to G4 may each include at least one LED, may have a configuration in which a plurality of LEDs are connected in series, and may have a configuration in which a plurality of LEDs are connected in series and in parallel. As shown in FIG. 8A, coupling points between both ends of the LED string STR and the LED groups G1 to G4 may be connected to the LED driver 150a.

The LED driver 150a may include a converter 152a and a plurality of current sources 153a to 156a. The converter 152a may generate a dimming signal DIM by converting the second control signal CTR2. For example, as described above with reference to FIG. 6, the second control signal CTR2 may have a variable current or a variable voltage, and the converter 152a may generate the dimming signal DIM having a variable voltage by converting the second control signal CTR2 or may generate the dimming signal DIM having a variable current according to configurations of the current sources 153a to 156a. In some embodiments, the converter 152a may include a limiter that limits the second control signal CTR2 to an upper bound and/or a lower bound, similar to the limiter 134_2 of FIG. 6. Also, in some embodiments, the converter 152a may be omitted when the second control signal CTR2 converted to a variable voltage corresponds to the range of the dimming signal DIM that is acceptable by the LED driver 150a. The dimming signal DIM may be provided to the plurality of current sources 153a to 156a and may be used to adjust the magnitudes of currents I1 to I4 of the plurality of current sources 153a to 156a.

The plurality of current sources 153a to 156a may be connected to connection points between an end of the LED string STR and the LED groups G1 to G4, respectively. As shown in FIG. 8A, a first current source 153a may provide a first current I1 passing through LEDs of the first group G1, a second current source 154a may provide a second current I2 passing through LEDs of first and second groups G1 and G2, a third current source 155a may provide a third current I3 passing through LEDs of first to third groups G1 to G3, and a fourth current source 156a may provide a fourth current I4 passing through LEDs of first to fourth groups G1 to G4. First to fourth currents I1 to I4 may be output to the outside of the LED driver 150a as the LED driving current I_LED. First to fourth currents sources 153a to 156a may adjust the currents I1 to I4, respectively, in response to the dimming signal DIM.

The LED driver 150a of FIG. 8A may generate the LED driving current I_LED having a magnitude that follows the magnitude of the full-wave rectified input voltage V_IN. Referring to FIG. 8B, the first current source 153a may be turned on at a time point t81 from a state in which the first to fourth currents sources 153a to 156a are turned off, and thus the LED driving current I_LED may have the magnitude of the first current I1. At a time point t82, the first current source 153a may be turned off and the second current source 154a may be turned on, and thus the LED driving current I_LED may have the magnitude of the second current I2. In a similar regard, at time points t83 and t84, the third current source 155a and the fourth current source 156a may be sequentially turned on, and thus the LED driving current I_LED may sequentially have the magnitude of the third current I3 and the magnitude of the fourth current I4.

At a time point t85, as the input voltage V_IN decreases, the fourth current source 156a may be turned off and the third current source 155a may be turned on, and thus the LED driving current I_LED may have the magnitude of the third current I3. In a similar regard, at time points t86 and t87, the second current source 154a and the first current source 153a may be sequentially turned on, and thus the LED driving current I_LED may sequentially have the magnitude of the second current I2 and the magnitude of the first current I1. As such, the method of driving LEDs by generating a current that follows the magnitude of the input voltage V_IN full-wave rectified from the AC voltage V_AC may be referred to as an AC direct LED driving scheme and may provide various advantages by replacing an AC/DC converter for driving LEDs. Korean Patent Publication No. 10-1490332, which is incorporated herein by reference in its entirety and filed by the same applicant as the present application, has proposed the AC direct LED driving method.

Figure 9:
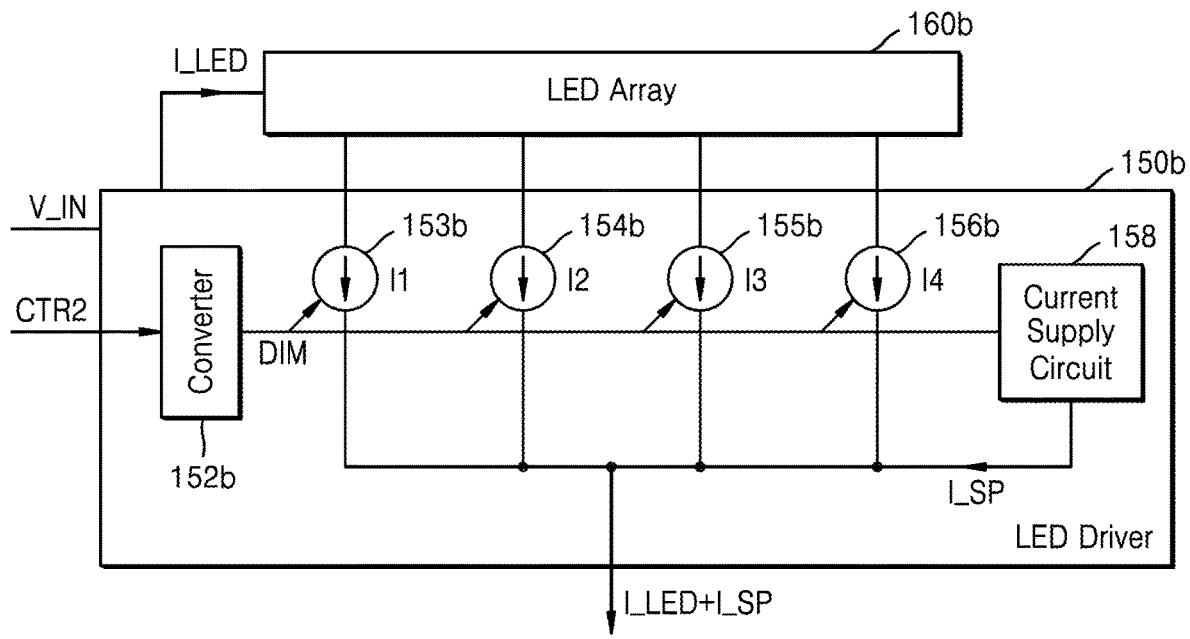
FIG. 9 is a diagram showing an example of the LED driver of FIG. 2 according to an example embodiment of the disclosure.

FIG. 9 is a diagram showing an example of the LED driver 150 of FIG. 2 according to an example embodiment of the disclosure. Compared with the LED driver 150a of FIG. 8A, a LED driver 150b of FIG. 9 may further include a current supply circuit 158. Hereinafter, descriptions identical to those of FIG. 8A will be omitted.

Referring to FIG. 9, the LED driver 150b may include a converter 152b, a plurality of current sources 153b to 156b, and the current supply circuit 158 and may provide the LED driving current I_LED to a LED array 160b. The LED driver 150b may adjust the intensity of light emitted by the LED array 160b by adjusting the LED driving current I_LED according to the second control signal CTR2. When the second control signal CTR2 corresponding to a low light intensity is received, the magnitude of the LED driving current I_LED may be reduced, and the magnitude of the current I_LED' transmitted to the power delivery circuit 130 of FIG. 2 may also be reduced. Accordingly, when the range of light intensity adjustment is large, generation of the positive supply voltage V_DD by the power delivery circuit 130 may not be easy. To resolve this, the LED driver 150b may include the current supply circuit 158 as described below.

The current supply circuit 158 may receive the dimming signal DIM and generate a supplementary current I_SP. For example, the current supply circuit 158 may recognize the magnitude of the LED driving current I_LED through the dimming signal DIM and, when the recognized magnitude of the LED driving current I_LED is smaller than a preset reference value, the current supply circuit 158 may generate a supplementary current I_SP. In some embodiments, the current supply circuit 158 may generate the supplementary current I_SP of which the magnitude varies according to the dimming signal DIM. Examples of the current supply circuit 158 will be described below with reference to FIGS. 10A and 10B. As a result, the LED driving current I_LED and the supplementary current I_SP may be provided to the power delivery circuit 130 as the current I_LED' of FIG. 2, and the power delivery circuit 130 may stably generate the positive supply voltage V_DD independently from the light intensity.

In some embodiments, the current supply circuit 158 may generate supplementary current I_SP to reduce power consumption and heat generation. For example, the current supply circuit 158 may generate the supplementary current I_SP that is inversely proportional to the input voltage V_IN or generate the supplementary current I_SP that is substantially zero in some intervals of the cycle of the input voltage V_IN.

Figure 10A:
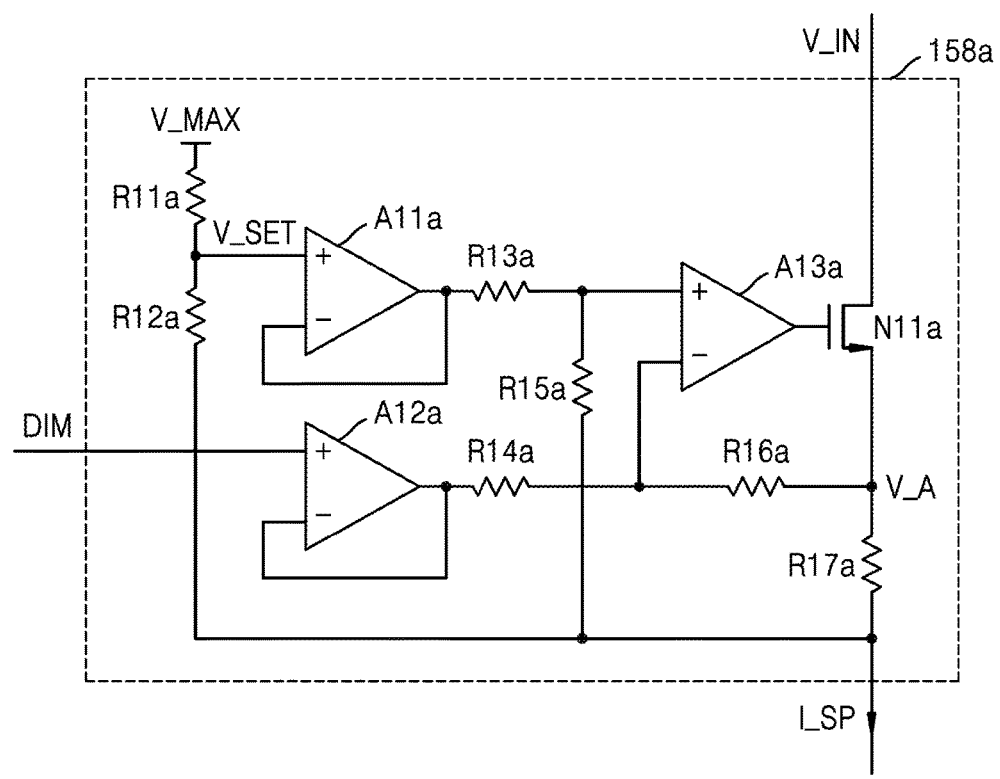
FIGS. 10A and 10B are circuit diagrams showing examples of a current supply circuit of FIG. 9 according to example embodiments of the disclosure.
Figure 10B:
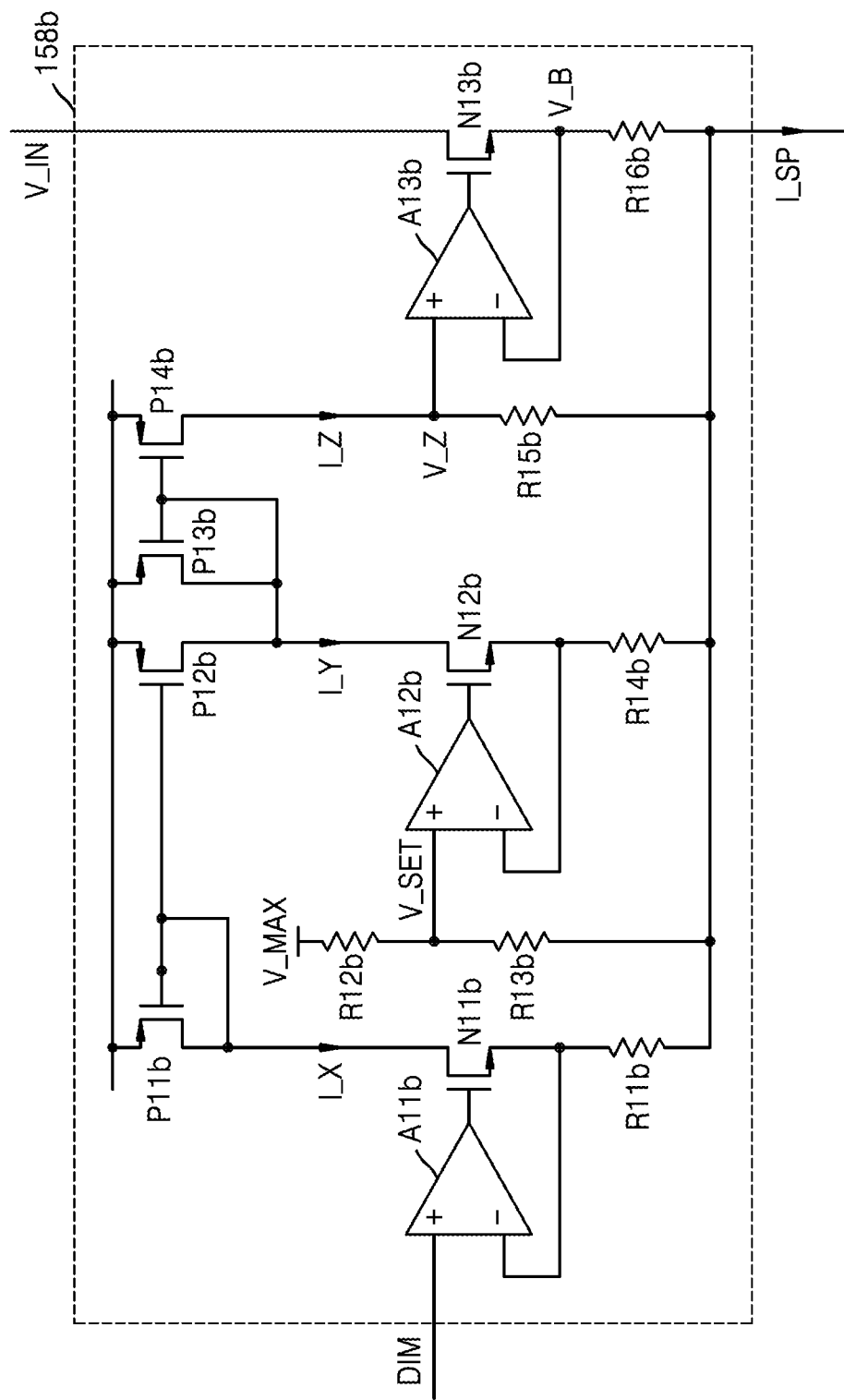

FIGS. 10A and 10B are circuit diagrams showing examples of the current supply circuit 158 of FIG. 9 according to example embodiments of the disclosure. As described above with reference to FIG. 9, current supply circuits 158a and 158b of FIGS. 10A and 10B may generate the supplementary current I_SP in response to the dimming signal DIM and, as shown in FIGS. 10A and 10B, may generate the supplementary current I_SP from the input voltage V_IN.

Referring to FIG. 10A, a current supply circuit 158a may include operational amplifiers A11a, A12a, and A13a, an NMOS transistor N11a, and resistors R11a to R17a. In FIG. 10A, voltages V_A, V_SET, DIM, and V_MAX are voltages with respect to a node from which the supplementary current I_SP is output. As shown in FIG. 10A, a voltage V_A of a source of the NMOS transistor N11a may be calculated as shown in [Equation 2] below.

$$V\_A = \frac{R15a}{R13a}(V\_SET = DIM), \quad \text{[Equation 2]}$$
$$\text{where } R13a = R14a \text{ and } R15a = R16a$$

When "R13a=R15a" in [Equation 2], it is "V_A=V_SET-DIM", and thus the supplementary current I_SP may be calculated as shown in [Equation 3] below.

$$I\_SP = \frac{V\_SET - DIM}{R17a} \quad \text{[Equation 3]}$$

According to [Equation 3], the magnitude of the supplementary current I_SP is approximately zero when the voltage of the dimming signal DIM exceeds a voltage "V_SET". When the voltage of the dimming signal DIM is lower than the voltage "V_SET", the magnitude of the supplementary current I_SP may increase as the voltage of the dimming signal DIM decreases. As shown in FIG. 10A, the voltage "V_SET" may be determined by a voltage "V_MAX" and resistors R11a and R12a. Meanwhile, operational amplifiers A11a and A12a of the current supply circuit 158a of FIG. 10A are for eliminating the loading effect of resistors R13a and R15a and resistors R14a and R16a, respectively. In some embodiments, both the operational amplifiers A11a and A12a may be omitted or one the operational amplifier A11a or A12a may be omitted.

Referring to FIG. 10B, the current supply circuit 158b may include operational amplifiers A11b, A12b, and A13b, NMOS transistors N11b, N12b, and N13b, PMOS transistors P11b, P12b, P13b, and P14b, and resistors R11b to R16b. In FIG. 10B, voltages V_B, V_SET, DIM, and V_MAX are voltages with respect to a node from which the supplementary current I_SP is output. As shown in FIG. 10B, a drain current I_X of an NMOS transistor N11b and a drain current I_Y of an NMOS transistor N12b may be calculated as shown in [Equation 4] below.

$$I\_X = \frac{DIM}{R11b}, \quad I\_Y = \frac{V\_SET}{R14b} \quad \text{[Equation 4]}$$

A pair of PMOS transistor P11b and P12b may form a current mirror, and a pair of PMOS transistors P13b and P14b may also form a current mirror. Therefore, a drain current I_Z of a PMOS transistor P14b may correspond to a difference between the drain current I_X and the drain current I_Y, as shown in [Equation 5] below.

$$I\_Z = I\_Y - I\_X = \frac{V\_SET}{R14b} - \frac{DIM}{R11b} \quad \text{[Equation 5]}$$

Therefore, a source voltage V_B of an NMOS transistor N13b may be calculated as shown in [Equation 6] below.

$$V\_B = I\_Z \cdot R15b = \frac{R15b}{R14b}V\_SET - \frac{R15b}{R11b}DIM \quad \text{[Equation 6]}$$

When "R11b=R14b=R15b", it is "V_Z=V_SET-DIM", and thus the supplementary current I_SP may be calculated as shown in [Equation 7] below.

$$I\_SP = \frac{V\_SET - DIM}{R16b} \quad \text{[Equation 7]}$$

According to [Equation 7], the magnitude of the supplementary current I_SP is approximately zero when the voltage of the dimming signal DIM exceeds the voltage "V_SET". When the voltage of the dimming signal DIM is lower than the voltage "V_SET", the magnitude of the supplementary current I_SP may increase as the voltage of the dimming signal DIM decreases. As shown in FIG. 10B, the voltage "V_SET" may be determined by the voltage "V_MAX" and resistors R12b and R13b.

Figure 11:
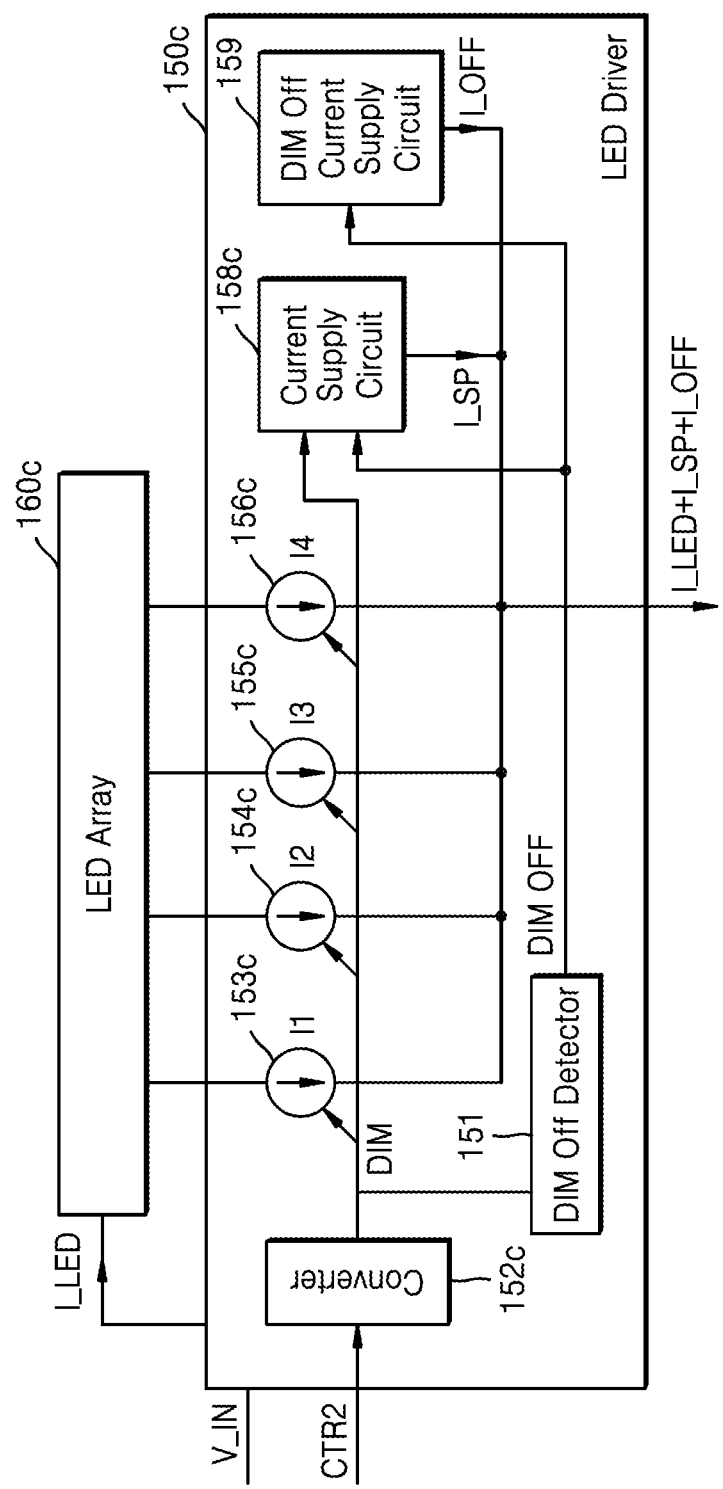
FIG. 11 is a block diagram showing an example of the LED driver of FIG. 2 according to an example embodiment of the disclosure.

FIG. 11 is a block diagram showing an example of the LED driver 150 of FIG. 2 according to an example embodiment of the disclosure. Compared with the LED driver 150*b* of FIG. 9, a LED driver 150*c* of FIG. 11 may further include a dimming off detector 151 and a dimming off current supply circuit 159. Hereinafter, descriptions identical to those of FIG. 8A and FIG. 9 will be omitted.

Referring to FIG. 11, the LED driver 150*c* may include a converter 152*c*, a plurality of current sources 153*c* to 156*c*, a current supply circuit 158*c*, the dimming off detector 151, and the dimming off current supply circuit 159 and may provide the LED driving current I_LED to a LED array 160*c*. The LED driver 150*c* may adjust the intensity of light emitted by the LED array 160*c* by adjusting the LED driving current I_LED according to the second control signal CTR2. In some embodiments, as in the example described above with reference to FIG. 7B, while the lighting apparatus 100 of FIG. 2 is being turned off in response to the external signal EXT, which corresponds to the external signal EXT of FIG. 6 and makes the magnitude of the first control signal CTR1 smaller than the preset lower bound V_LB, that is, while no light is emitted by the LED array 160*c*, power corresponding to a standby state may be supplied to the peripheral component 140. For example, when the external signal EXT by which the LED array 160*c* may emit light again from a turned off state is input (e.g., when the external signal EXT that makes the first control signal CTR1 becomes greater than the preset lower bound V_LB is input), only power (e.g., a standby power) for the peripheral component 140 to be in the standby state normally receiving the external signal EXT and providing the first control signal CTR1 corresponding thereto may be supplied to the peripheral component 140.

As described above, when the dimming signal DIM is input at a level lower than or equal to a preset level, the supplementary current I_SP of the current supply circuit 158*c* may increase as the dimming signal DIM decreases. In some embodiments, similar to the LED driving current I_LED shown in FIG. 8B, the supplementary current I_SP of the current supply circuit 158*c* may follow the input voltage V_IN, and thus, when dimming off, the power consumption of the current supply circuit 158*c* may be greater than power consumption of the lighting apparatus 100 in the standby state. Therefore, it may be necessary to turn off the current supply circuit 158*c* to reduce power consumption in a dimming off state, that is, the standby state. In the dimming off state, when the current I_LED is approximately zero and the supplementary current I_SP is also approximately zero as the current supply circuit 158*c* is turned off, the current I_LED' of the lighting apparatus 100 of FIG. 2 may become approximately zero, and thus it may not be easy for the power delivery circuit 130 to supply power to the peripheral component 140.

In the dimming off state, the dimming off current supply circuit 159 may provide an OFF current I_OFF for reducing power consumption of the lighting apparatus 100 and supplying the standby power to the peripheral component 140. The dimming off detector 151 may detect the dimming off state from the dimming signal DIM and output a dimming off signal DIM_OFF according to the detected dimming off state. In some embodiments, the dimming off detector 151 may receive the second control signal CTR2 and may output the dimming off signal DIM_OFF according to the second control signal CTR2. In some embodiments, the dimming off detector 151 may receive a separate signal indicating the dimming off state, e.g., a dimming off control signal, from the power delivery circuit 130 and output the dimming off signal DIM_OFF according to the dimming off control signal. When the dimming off signal DIM_OFF is activated, the current supply circuit 158*c* is turned off, and thus the supplementary current I_SP may become approximately zero. Meanwhile, the dimming off current supply circuit 159 may be turned on and supply the OFF current I_OFF to the power delivery circuit 130 of the lighting apparatus 100.

As described above, the LED driver 150*c* may include the dimming off detector 151 and the dimming off current supply circuit 159 to supply the standby power to the peripheral component 140 when the lighting apparatus 100 is in the standby state. However, as exemplified with reference to FIG. 12, it will be understood that various methods may be employed to supply standby power to the peripheral components 140 when the lighting apparatus 100 of FIG. 2 is in the dimming off state according to example embodiments of the disclosure.

Figure 12:
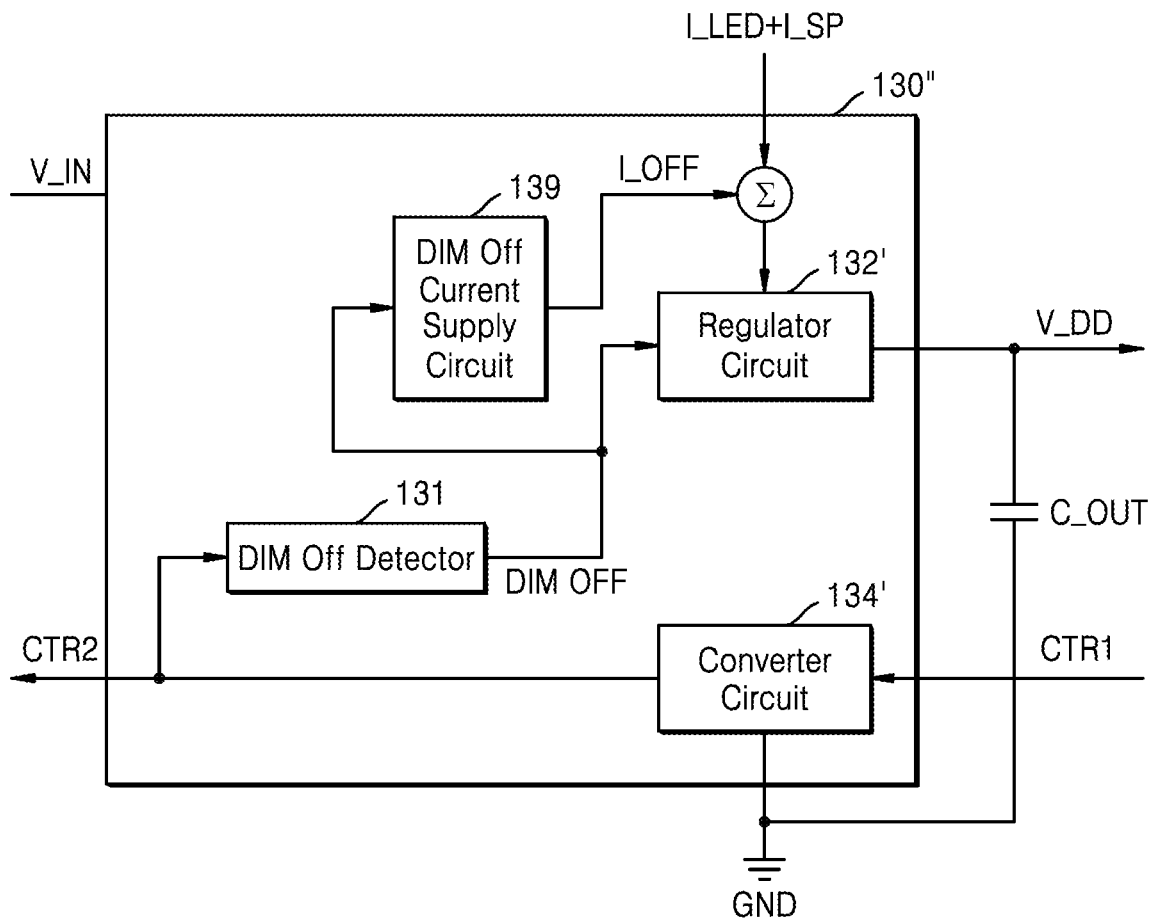
FIG. 12 is a block diagram showing an example of the power delivery circuit of FIG. 2 according to an example embodiment of the disclosure.

FIG. 12 is a block diagram showing an example of the power delivery circuit 130 of FIG. 2 according to an example embodiment of the disclosure. In detail, FIG. 12 shows a power delivery circuit 130" supplying standby power to the peripheral component 140 when the lighting apparatus 100 in the dimming off state. As shown in FIG. 12, the power delivery circuit 130" may include a dimming off detector 131 and a dimming off current supply circuit 139 similar to the dimming off detector 151 and the dimming off current supply circuit 159 included in the LED driver 150*c* of FIG. 11. Hereinafter, it is assumed that the power delivery circuit 130" of FIG. 12 receives a current supplied from the LED driver 150*b* of FIG. 9, and FIG. 12 will be described with reference to FIG. 9. Also, descriptions identical to those of FIG. 3 will be omitted.

Referring to FIG. 12, the power delivery circuit 130" may further include a regulator circuit 132', a converter circuit 134', the dimming off detector 131, and the dimming off current supply circuit 139. The regulator circuit 132' may receive the LED driving current I_LED and the supplementary current I_SP from the LED driver 150*b* of FIG. 9 and may additionally receive the OFF current I_OFF from the dimming off current supply circuit 139 in the power delivery circuit 130". As shown in FIG. 12, compared to the power delivery circuit 130' of FIG. 3, the power delivery circuit 130" may receive the input voltage V_IN to supply power to the dimming off current supply circuit 139.

When the lighting apparatus 100 of FIG. 2 enters the standby state by receiving the external signal EXT that makes the magnitude of the first control signal CTR1 of FIG. 6 to become smaller than the preset lower bound V_UB, the LED driver 150*b* may provide the LED driving current I_LED and the supplementary current I_SP that are approximately zero (due to, for example, a dimming off detector similar to the dimming off detector 151 exemplified in FIG. 11). In some embodiments, the dimming off signal DIM_OFF of the dimming off detector 131 included in the power delivery circuit 130" of FIG. 12 may be provided to the LED driver 150*b* of FIG. 9, and the LED driver 150*b* of FIG. 9 may provide the LED driving current I_LED and the supplementary current I_SP, which are approximately zero, in response to the dimming off signal DIM_OFF.

When the lighting apparatus 100 of FIG. 2 enters the standby state, the dimming off detector 131 may detect the dimming off state from the second control signal CTR2 and output the dimming off signal DIM_OFF. In some embodiments, the dimming off detector 131 may receive a first control signal CTR1 and may output the dimming off signal DIM_OFF based on the first control signal CTR1. When the dimming off signal DIM_OFF is activated, the dimming off current supply circuit 139 may be turned on and supply the OFF current I_OFF to the regulator circuit 132' of the power delivery circuit 130". In some embodiments, a portion of regulator circuit 132, e.g., the shunt regulator 132_2 of FIG. 4, may be turned off according to the activated dimming off signal DIM_OFF.

In some embodiments, when the lighting apparatus 100 of FIG. 2 enters the standby state, a shunt regulator (e.g., 132_2 of FIG. 4) included in the regulator circuit 132' may be turned off when the dimming off signal DIM_OFF is activated. As described above with reference to FIGS. 5A to 5C, the shunt regulator included in the regulator circuit 132' may receive the current I_LED' and regulate the first positive supply voltage V_DD1. Therefore, controlling the average current of the OFF current I_OFF of the dimming off current supply circuit 139 to entirely become a supply current needed in the standby state, instead of providing an average current of the OFF current I_OFF of the dimming off current supply circuit 139 to the shunt regulator of the regulator circuit 132', may be more efficient to reduce the power consumption of the lighting apparatus 100 in the standby state. Similarly, it may be more efficient that the average current of the OFF current I_OFF of the dimming off current supply circuit 159 of FIG. 11 entirely becomes the supply current needed in the standby state of the peripheral components 140. Hereinafter, examples of controlling the regulator circuit 132' in the dimming off state will be described below with reference to FIGS. 13A to 13C, and examples of the dimming off current supply circuits 139 and 159 of FIGS. 11 and 12 will be described below with reference to FIGS. 14A to 14C.

Figure 13A:
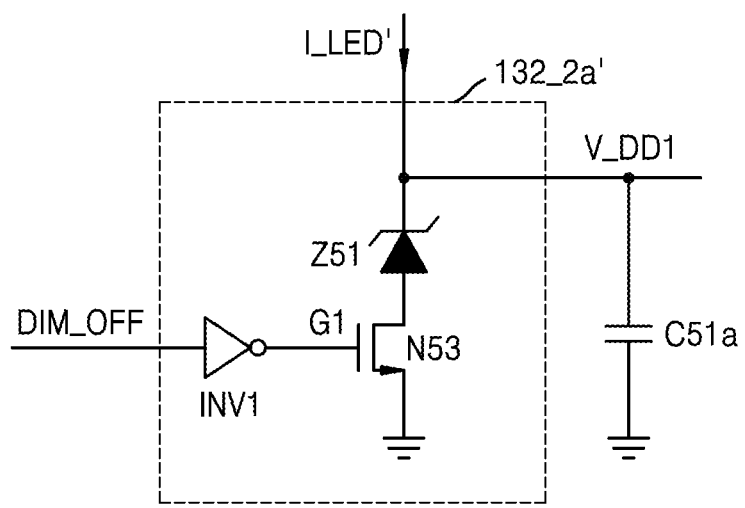
FIGS. 13A to 13C are circuit diagrams showing examples of the shunt regulator of FIG. 4 according to example embodiments of the disclosure.
Figure 13B:
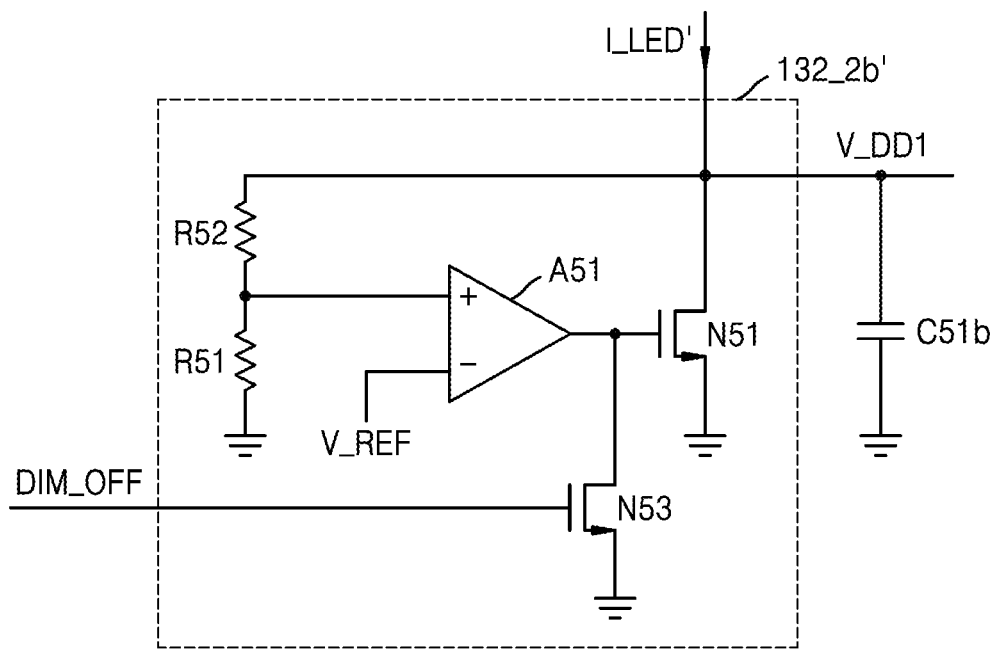
Figure 13C:
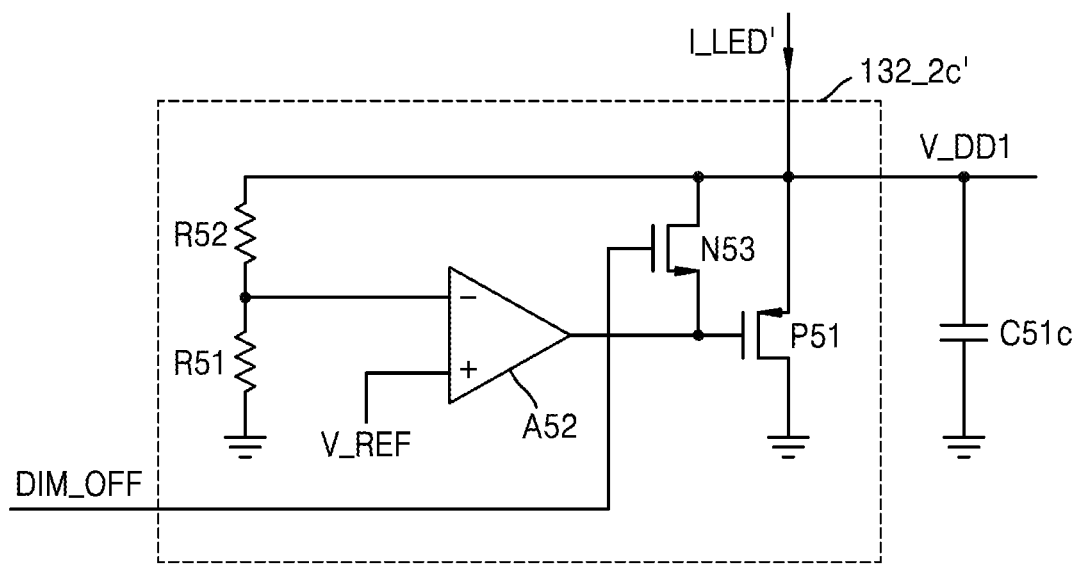

FIGS. 13A to 13C are circuit diagrams showing examples of the shunt regulator 132_2 of FIG. 4 according to example embodiments of the disclosure. In detail, shunt regulators of FIGS. 13A to 13C may receive the dimming off signal DIM_OFF as compared to shunt regulators 132_2a, 132_2b, and 132_2c of FIGS. 5A through 5C. Hereinafter, descriptions identical to those of FIG. 5A and FIG. 5C will be omitted.

Referring to FIG. 13A, in a shunt regulator 132_2a', according to the activated (that is, high level) dimming off signal DIM_OFF, an output G1 of an inverter INV may be at a low level, and an NMOS transistor N53 may be turned off. Therefore, a current passing through a zener diode Z51 may be blocked, and thus the shunt regulator 132_2a' may be turned off. Referring to FIG. 13B, in a shunt regulator 132_2b', according to the activated dimming off signal DIM_OFF, an NMOS transistor N53 may be turned on, and thus the NMOS transistor N51 may be turned off. As a result, the shunt regulator 132_2b' may be turned off. Referring to FIG. 13C, in a shunt regulator 132_2c', according to the activated dimming off signal DIM_OFF, an NMOS transistor N53 may be turned on, and thus a PMOS transistor P51 may be turned off. As a result, the shunt regulator 132_2c' may be turned off. Shunt regulators 132_2a', 132_21Y, and 132_2c' described above with reference to FIGS. 13A to 13C are merely examples, and it will be understood that various types of shunt regulators that are turned off in response to the dimming off signal DIM_OFF may be employed according to example embodiments of the disclosure.

Figure 14A:
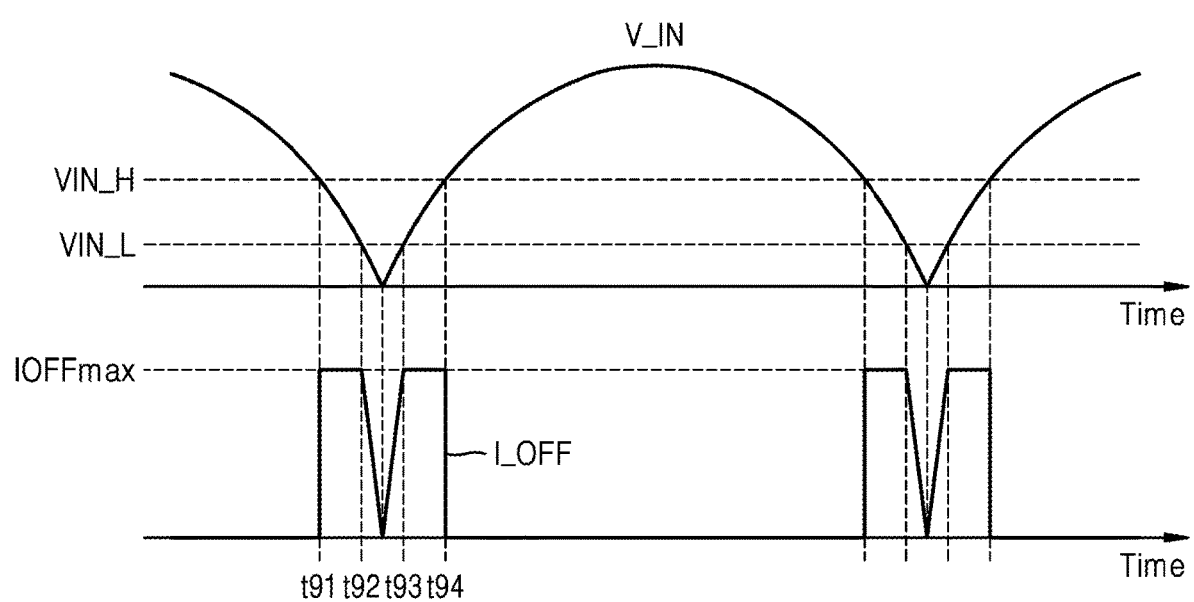
FIGS. 14A to 14C are diagrams showing examples of reducing power consumption of the lighting apparatus of FIG. 2 in a standby state according to example embodiments of the disclosure.
Figure 14B:
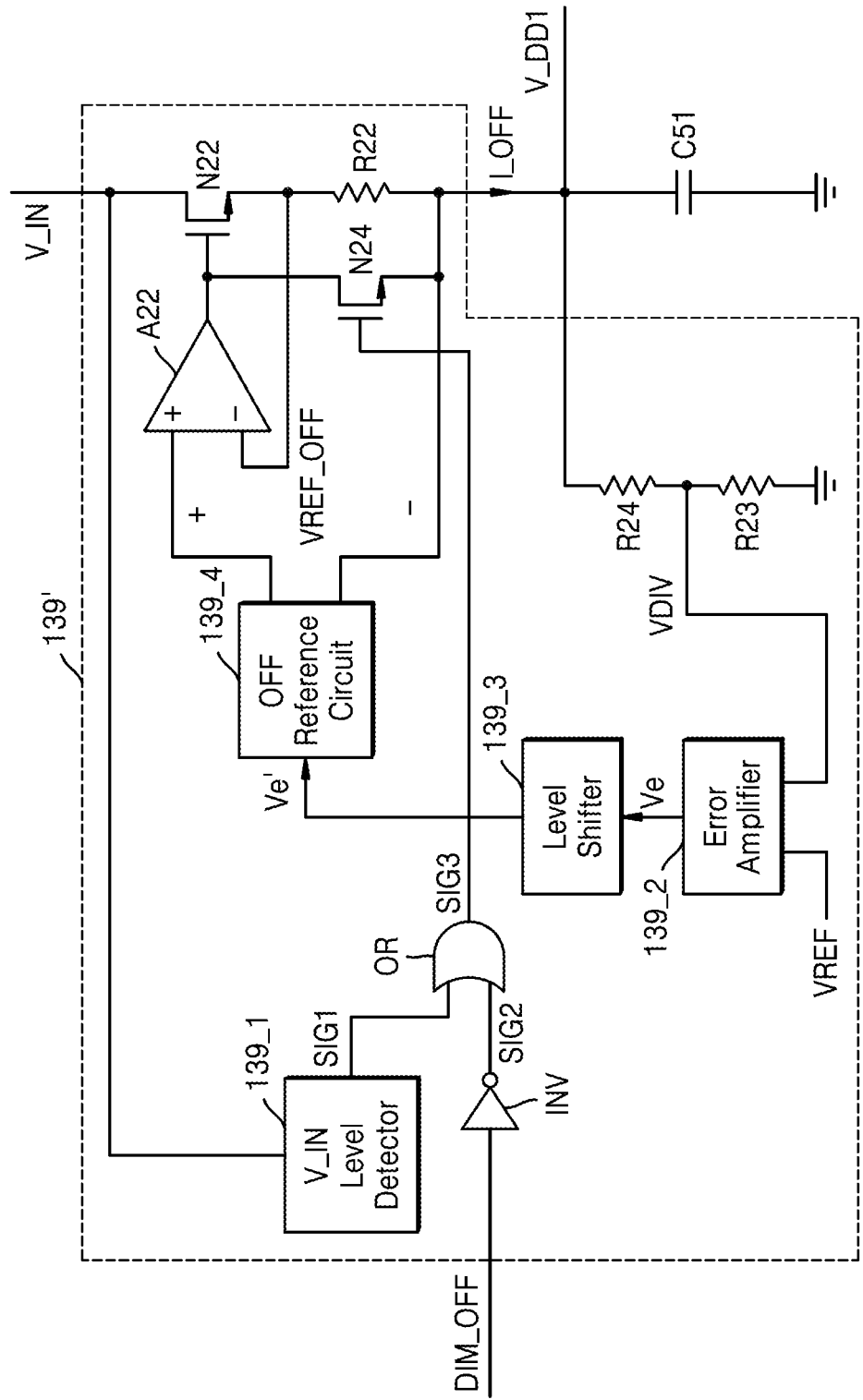
Figure 14C:
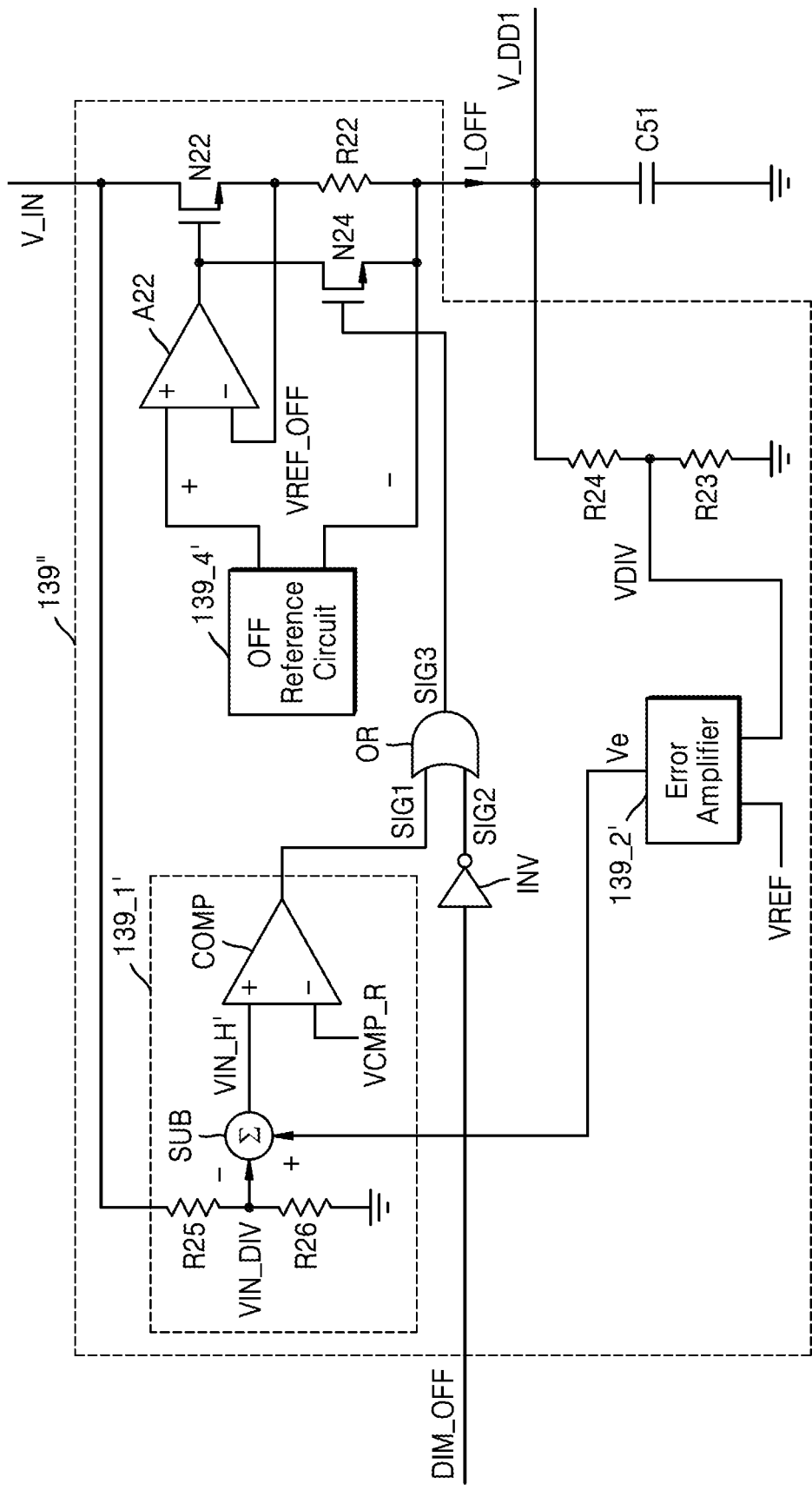

FIGS. 14A to 14C are diagrams showing examples of reducing power consumption of the lighting apparatus 100 of the FIG. 2 in the standby state according to example embodiments of the disclosure. In detail, FIG. 14A is a graph showing examples of operation intervals of the dimming off current supply circuits 139 and 159 and waveforms of the OFF current I_OFF of the dimming off current supply circuits 139 and 159 of FIGS. 11 and 12, and FIGS. 14B and 14C are block diagrams showing respective examples 139' and 159' of the dimming off current supply circuits 139 and 159 of FIGS. 11 and 12 according to example embodiments of the disclosure. Hereinafter, FIGS. 14A to 14C will be described with reference to the dimming off current supply circuit 139 of FIG. 12, but it will be understood that the same or similar descriptions may be applied to the dimming off current supply circuit 159 of FIG. 11. Hereinafter, redundant descriptions of FIGS. 14B and 14C will be omitted.

Referring to FIG. 14A, when the dimming off signal DIM_OFF is activated, to reduce power consumption of the lighting apparatus 100 in the standby state, the dimming off current supply circuit 139 of FIG. 12 may supply the OFF current I_OFF by being activated in an interval (e.g., an interval from a time point T91 to a time point t94) in which the input voltage V_IN is smaller than a voltage VIN_H at every cycle of the input voltage V_IN. In addition, in an interval in which the input voltage V_IN is greater than a voltage VIN_L but smaller than the voltage VIN_H (e.g., an interval between the time point t91 and a time point t92 and an interval between a time point t93 and the time point t94), the dimming off current supply circuit 139 may supply a maximum OFF current (IOFFmax). In an interval in which the input voltage V_IN is less than the voltage VIN_L (e.g., an interval between the time point t92 and the time point t93), the dimming off current supply circuit 139 may supply the OFF current I_OFF that decreases as the input voltage V_IN decreases.

For the average current of the OFF current I_OFF of the dimming off current supply circuit 139 to become a current demanded by the peripheral component 140 in the standby state, in some embodiments, the magnitude of the maximum OFF current IOFFmax may be controlled while a current supplying interval (e.g., the interval between the time point t91 and the time point t94) is fixed. In some other embodiments, the magnitude of the voltage VIN_H may be controlled while the maximum OFF current IOFFmax is fixed, thereby extending or shortening the current supplying interval (e.g., the interval between the time point t91 and the time point t94).

Referring to FIG. 14B, the average current of the OFF current I_OFF generated by the dimming off current supply circuit 139' may be controlled to be the current demanded by the peripheral component 140 in the standby state by controlling the magnitude of the maximum OFF current IOFFmax. As shown in FIG. 14B, the dimming off current supply circuit 139' may include an input voltage level detector 139_1, an error amplifier 139_2, a level shifter 139_3, an OFF reference circuit 139_4, logic gates INV and OR, an operational amplifier A22, NMOS transistors N22 and N24, and resistors R22 to R24. An output SIG2 of the inverter INV may be at a high level and an output SIG3 of an OR_gate OR may be at a high level according to the dimming off signal DIM_OFF which is deactivated, that is, at a low level. Therefore, An NMOS transistor N24 may be turned on and an NMOS transistor N22 may be turned off, and thus the OFF current I_OFF may be approximately zero. On the other hand, according to the activated (that is, at the high level) dimming off signal (DIM_OFF), the output SIG2 of the inverter INV may be at the low level, and the output SIG3 of the OR_gate OR may be at the high level or the low level according to an output SIG1 of the input voltage level detector 139_1, and thus the NMOS transistor N22 may be in the ON state, that is, a state for supplying the OFF current I_OFF or in the OFF state.

When the dimming off signal DIM_OFF is activated and the input voltage V_IN greater than a preset voltage VIN_H is input to the input voltage level detector 139_1, the output SIG1 may be at the high level. Therefore, the NMOS transistor N22 may be turned off, and thus the OFF current I_OFF may be approximately zero. On the other hand, when the input voltage V_IN smaller than the preset voltage VIN_H is input to the input voltage level detector 139_1, both outputs SIG1 and SIG3 may be at the low level, and thus the NMOS transistor N24 may be turned off. Therefore, the dimming off current supply circuit 139' may operate normally and supply the OFF current I_OFF to a node of the first positive supply voltage V_DD1.

The error amplifier 139_2 may generate a voltage Ve by comparing a reference voltage VREF with a voltage VDIV divided by the resistors R23 and R24 and amplifying an error therebetween and output the voltage Ve to the level shifter 139_3. The OFF reference circuit 139_4 may receive an output voltage Ve' of the level shifter 139_3 and output a voltage VREF_OFF that is generated with respect to the first positive supply voltage V_DD1. An output voltage Ve of the error amplifier 139_2 is generated with respect to a ground voltage, whereas an output voltage VREF_OFF of the OFF reference circuit 139_4 is generated with respect to the first positive supply voltage V_DD1. Therefore, DC level shifting of the output voltage Ve of the error amplifier 139_2 may be necessary, such that the output voltage VREF_OFF of the OFF reference circuit 139_4 increases or decreases with respect to the first positive supply voltage V_DD1 as the output voltage Ve increases or decreases. The level shifter 139_3 may provide such a DC level shifting, output a DC level shifted voltage Ve' from the output voltage Ve of the error amplifier 139_2, and supply the DC level shifted voltage Ve' to the OFF reference circuit 139_4.

In the example of FIG. 14B, when the first positive supply voltage V_DD1 gradually increases/decreases, the voltages VDIV divided by the resistors R23 and R24 may also gradually increase/decrease. Therefore, the error amplifier 139_2 may compare the reference voltage VREF with the divided voltage VDIV, amplify an error therebetween, and output the voltage Ve gradually decreasing/increasing, and the output voltage Ve' of the level shifter 139_3 may also gradually decrease/increase. As the output voltage Ve' of the level shifter 139_3 gradually decreases/increases, the output voltage VREF_OFF of the OFF reference circuit 139_4 may gradually decrease/increase, and the maximum OFF current IOFFmax of the dimming off current supply circuit 139' may also gradually decrease/increase, and thus a feedback (i.e., negative feedback) control that offsets increase/decrease of the initial first positive supply voltage V_DD1 may be provided. According to such a feedback control, the OFF current supply circuit 139' may supply a standby state current for the peripheral component 140 and reduce power consumption of the lighting apparatus 100 of FIG. 2.

The maximum OFF current IOFFmax of the dimming off current supply circuit 139' may be calculated as shown in [Equation 8] below.

$$IOFFmax = \frac{VREF\_OFF}{R22} \quad \text{[Equation 8]}$$

Also, the first positive supply voltage V_DD1 by the dimming off current supply circuit 139' may be calculated as shown in [Equation 9] below.

$$V\_DD1 = \left(1 + \frac{R24}{R23}\right) \cdot VREF \quad \text{[Equation 9]}$$

Referring to FIG. 14C, while the maximum OFF current IOFFmax is being fixed, the magnitude of the voltage VIN_H may be controlled to extend or shorten the current supplying interval (e.g., the interval between the time point t91 and the time point t94 of FIG. 14A), and thus the average voltage of the OFF current I_OFF of a dimming off current supply circuit 139" may be controlled to become a current demanded by the peripheral component 140 in the standby state. As shown in FIG. 14C, the dimming off current supply circuit 139" may include an input voltage level detector 139_1', an error amplifier 139_2', an OFF reference circuit 139_4', the logic gates INV and OR, an operational amplifier A22, the NMOS transistors N22 and N24, and resistors R22 to R26.

The input voltage level detector 139_1' may include resistors R25 and R26, a subtractor SUB, and a comparator COMP. The divided voltage VIN_DIV may be generated by dividing the input voltage V_IN by the resistors R25 and R26. The subtractor SUB may supply an output voltage VIN_H' to the comparator COMP by subtracting a divided voltage VIN_DIV from the output voltage Ve of the error amplifier 139_2', and the comparator COMP may generate the output voltage SIG1 by comparing the output voltage VIN_H' of the subtractor SUB with a reference voltage VCMP_R. When the output voltage Ve of the error amplifier 139_2' increases and decreases, the output voltage VIN_H' may also increase or decrease. Therefore, the current supplying interval (e.g., the interval between the time point t91 and the time point t94 of FIG. 14A) of the OFF current I_OFF of the dimming off current supply circuit 139" may be extended/shortened.

An output SIG2 of the inverter INV may be at a high level and an output SIG3 of an OR_gate OR may be at a high level according to the dimming off signal DIM_OFF which is deactivated, that is, at a low level. The NMOS transistor N24 may be turned on and the NMOS transistor N22 may be turned off, and thus the OFF current I_OFF may be approximately zero. On the other hand, according to the activated (that is, at the high level) dimming off signal (DIM_OFF), the output SIG2 of the inverter INV may be at the low level, and the output SIG3 of the OR_gate OR may be at the high level or the low level according to an output SIG1 of the input voltage level detector 139_1', and thus the NMOS transistor N22 may be in the ON state, that is, a state for supplying the OFF current I_OFF or in the OFF state.

While the dimming off signal DIM_OFF is being enabled, when the output voltage VIN_H' of the subtractor SUB becomes higher than the reference voltage VCMP_R of the comparator COMP, the output SIG1 may be at the high level, and thus the NMOS transistor N22 may be turned off and the OFF current I_OFF may become approximately zero. On the other hand, while the dimming off signal DIM_OFF is being enabled, when the output voltage VIN_H' of the subtractor SUB becomes lower than the reference voltage VCMP_R of the comparator COMP, the output SIG1 may be at the low level, and thus the NMOS transistor N24 may be turned off. Therefore, the dimming off current supply circuit 139" may operate normally and supply the OFF current I_OFF to a node of the first positive supply voltage V_DD1. The error amplifier 139_2' may compare the reference voltage VREF with the voltages VDIV divided by resistors R23 and R24 and amplify an error therebetween, thereby outputting the voltage Ve to the subtractor SUB of the input voltage level detector 139_1'. The OFF reference circuit 139_4' may output a constant voltage VREF_OFF generated with respect to the first positive supply voltage V_DD1. Therefore, the maximum OFF current IOFFmax may have a constant value calculated as in [Equation 8] above.

In the example of FIG. 14C, when the first positive supply voltage V_DD1 gradually increases/decreases, the voltages VDIV divided by the resistors R23 and R24 may also gradually increase/decrease. Therefore, the error amplifier 139_2 may compare the reference voltage VREF with the divided voltage VDIV and amplify an error therebetween, thereby outputting the error voltage Ve gradually decreasing/increasing. As the error voltage Ve gradually decreases/increases, the output voltage VIN_H' of the subtractor SUB may also gradually decrease/increase. Therefore, the current supplying interval (e.g., the interval between the time point t91 and the time point t94 of FIG. 14A) of the OFF current I_OFF of the dimming off current supply circuit 139'' may be shortened/extended. This shortening/extension of the current supplying interval may provide feedback (i.e., negative feedback) control that offsets increase/decrease of the initial first positive supply voltage V_DD1. According to such a feedback control, the OFF current supply circuit 139'' may supply a standby state current for the peripheral component 140 and reduce power consumption of the lighting apparatus 100 of FIG. 2.

Figure 15A:
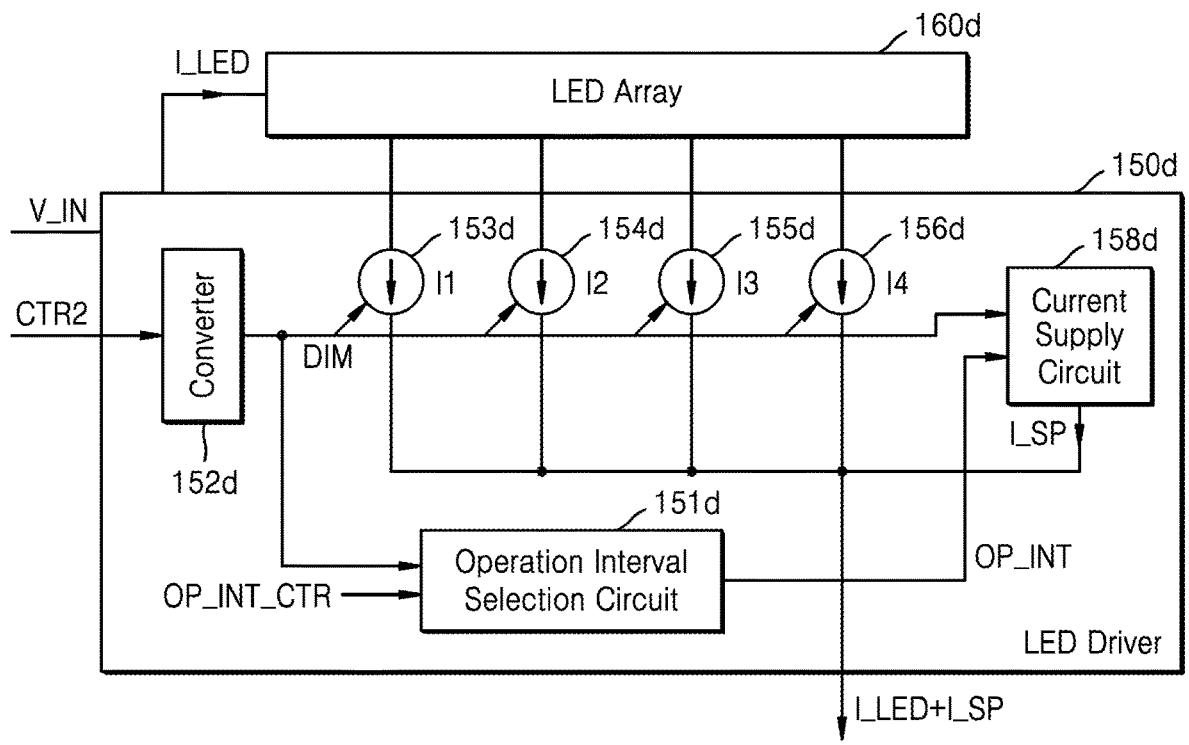
FIG. 15A is a diagram showing an example of the LED driver of FIG. 2 according to an example embodiment of the disclosure.
Figure 15B:
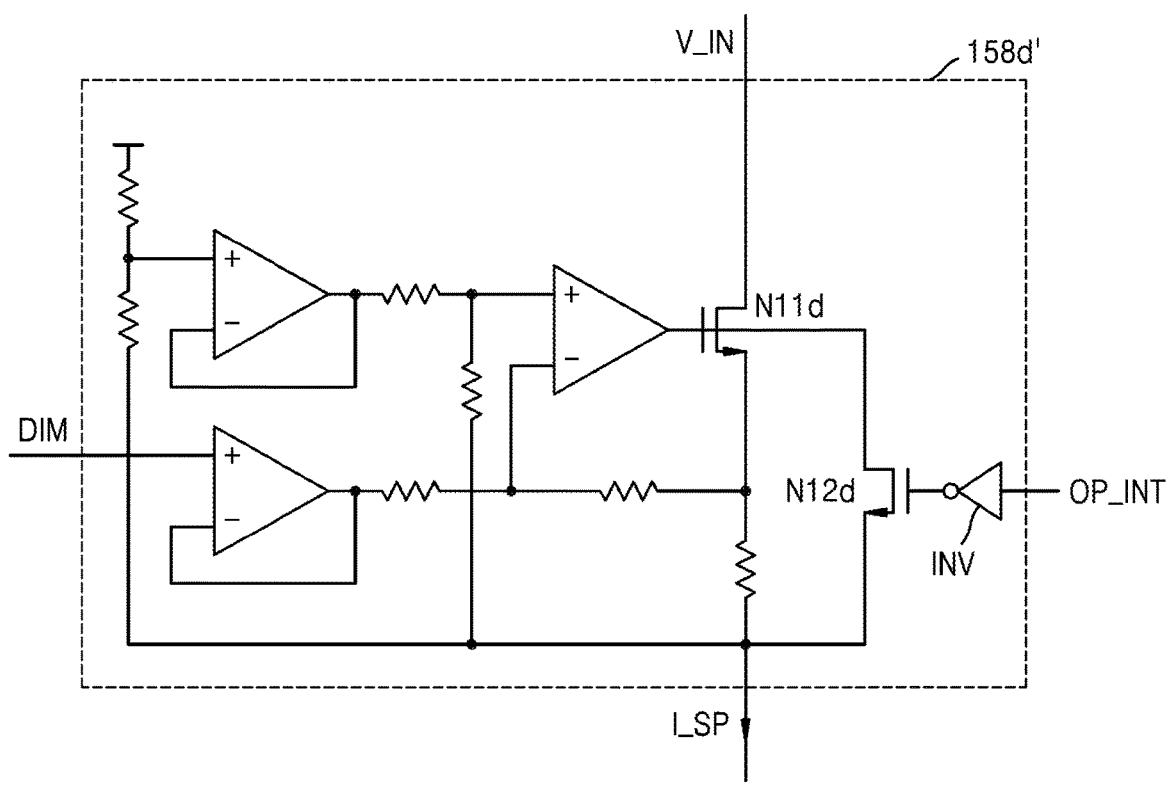
FIG. 15B is a diagram showing an example of a current supply circuit of FIG. 15A according to an example embodiment of the disclosure.

FIG. 15A is a diagram showing an example of the LED driver 150 of FIG. 2 according to an example embodiment of the disclosure, and FIG. 15B is a diagram showing an example of a current supply circuit 158d of FIG. 15A according to an example embodiment of the disclosure. In detail, compared to the LED driver 150b of FIG. 9, the LED driver 150d of FIG. 15A may further include an operation interval selection circuit 151d, and the current supply circuit 158d may receive an operation interval signal OP_INT from the operation interval selection circuit 151d. Hereinafter, descriptions identical to those of FIG. 8A and FIG. 9 will be omitted.

Referring to FIG. 15A, the LED driver 150d may include a converter 152d, the operation interval selection circuit 151d, a plurality of current sources 153d to 156d, and a current supply circuit 158d and may provide the LED driving current I_LED to an LED array 160d. The operation interval selection circuit 151d may receive the dimming signal DIM and an operation interval control signal OP_INT_CTR. The operation interval control signal OP_INT_CTR may indicate an operation interval of the input voltage V_IN in which power consumption in the current supply circuit 158d may be lowered. For example, the operation interval control signal OP_INT_CTR may be activated in an interval in which a first current source 153d operates (e.g., an interval between a time point t81 and a time point t82 and an interval between a time point t87 and a time point t88 in FIG. 8B), an interval in which the first current source 153d and a second current source 154d operate (e.g., an interval between the time point t81 and a time point t83 and an interval between a time point t86 and the time point t88 in FIG. 8B), or an interval in which first to fourth current sources 153d to 156d are all deactivated (e.g., an interval before the time point t81 and an interval after the time point t88 in FIG. 8B), from among intervals in which the first to fourth current sources 153d to 156d operate. In some embodiments, the operation interval control signal OP_INT_CTR may be activated based on time points at which the first to fourth currents source 153d to 156d are turned on or turned off or may be activated based on the magnitude of the input voltage V_IN.

In some embodiments, when the operation interval control signal OP_INT_CTR is activated and the dimming signal DIM corresponding to the LED driving current I_LED lower than a preset reference value is received, the operation interval signal OP_INT may be activated (e.g., high level). The current supply circuit 158d may provide the supplementary current I_SP only during intervals in which the input voltage V_IN is relatively low in response to the activated operation interval signal OP_INT. Therefore, power consumption of the current supply circuit 158d may be reduced, and power consumption and heat generation of the LED driver 150d may be reduced. In this case, the supplementary current I_SP of the current supply circuit 158d may depend on the dimming signal DIM, for example, as described above with reference to FIGS. 10A and 10B, may follow the input voltage V_IN, may be a current inversely proportional to the input voltage V_IN, may have an arbitrary current waveform, or may have a constant magnitude independent of the dimming signal DIM.

Referring to FIG. 15B, compared with the current supply circuit 158a of FIG. 10A, a current supply circuit 158d' of FIG. 15B may further include an NMOS transistor N12d and the inverter INV and may further receive the operation interval signal OP_INT. Hereinafter, descriptions identical to those of FIG. 10A will be omitted. When the activated (e.g., high level) operation interval signal OP_INT is received, the NMOS transistor N12d may be turned off, and thus the current supply circuit 158d' may supply the supplementary current I_SP as shown in [Equation 3]. On the other hand, when a deactivated (e.g., low level) operation interval signal OP_INT is received, the NMOS transistor N12d may be turned on and an NMOS transistor N11d may be turned off, and thus the supplementary current I_SP may be approximately zero.

In some embodiments, the current supply circuit 158d' of FIG. 15B may be implemented within the power delivery circuit 130 of FIG. 2. For example, the dimming off current supply circuit 139 of FIG. 12 may receive the operation interval signal OP_INT and perform the same or similar function as that of the current supply circuit 158d described above with reference to FIG. 15B. Also, in some embodiments, the current supply circuit 158d of FIG. 15A may supply the supplementary current I_SP only during intervals in which the operation interval signal OP_INT is activated.

Figure 16A:
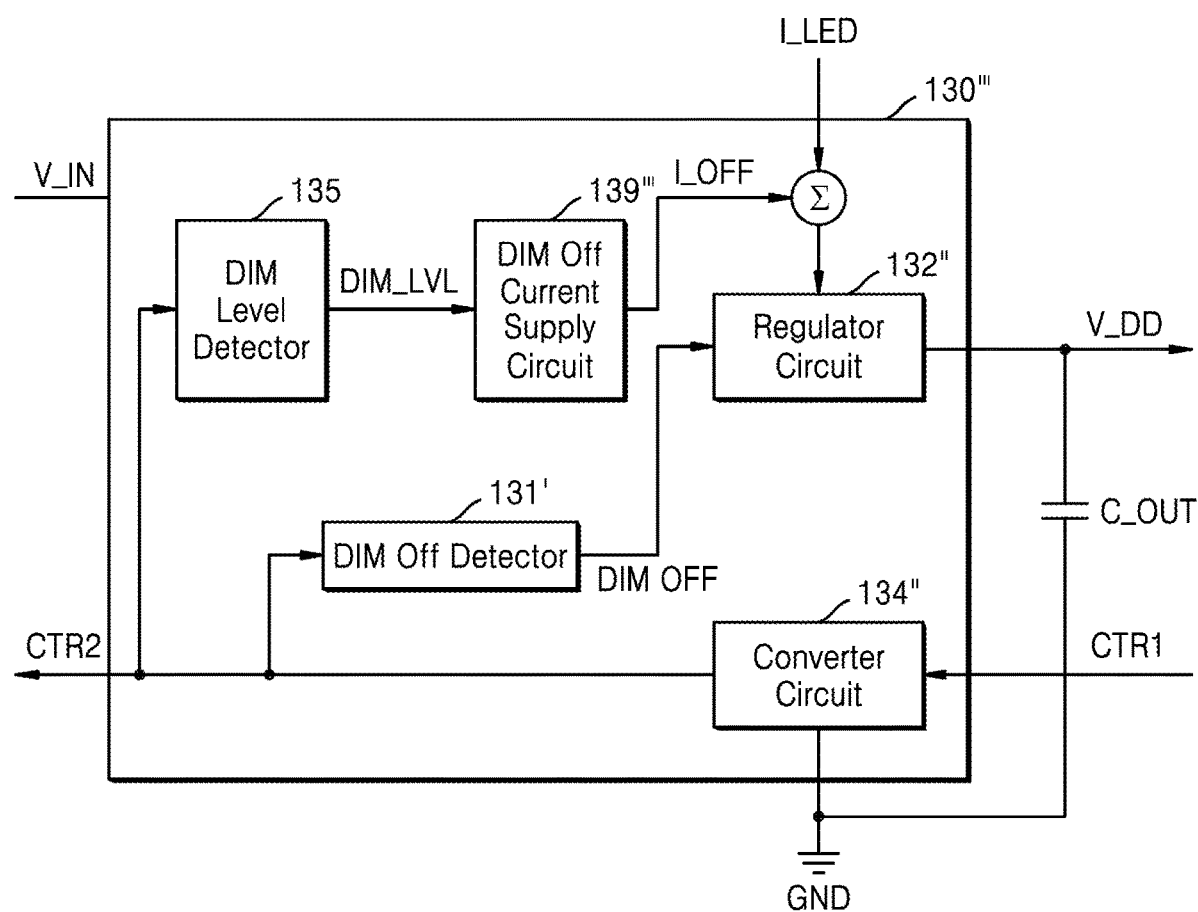
FIG. 16A is a diagram showing an example of the power delivery circuit of FIG. 2 according to an example embodiment of the disclosure.
Figure 16B:
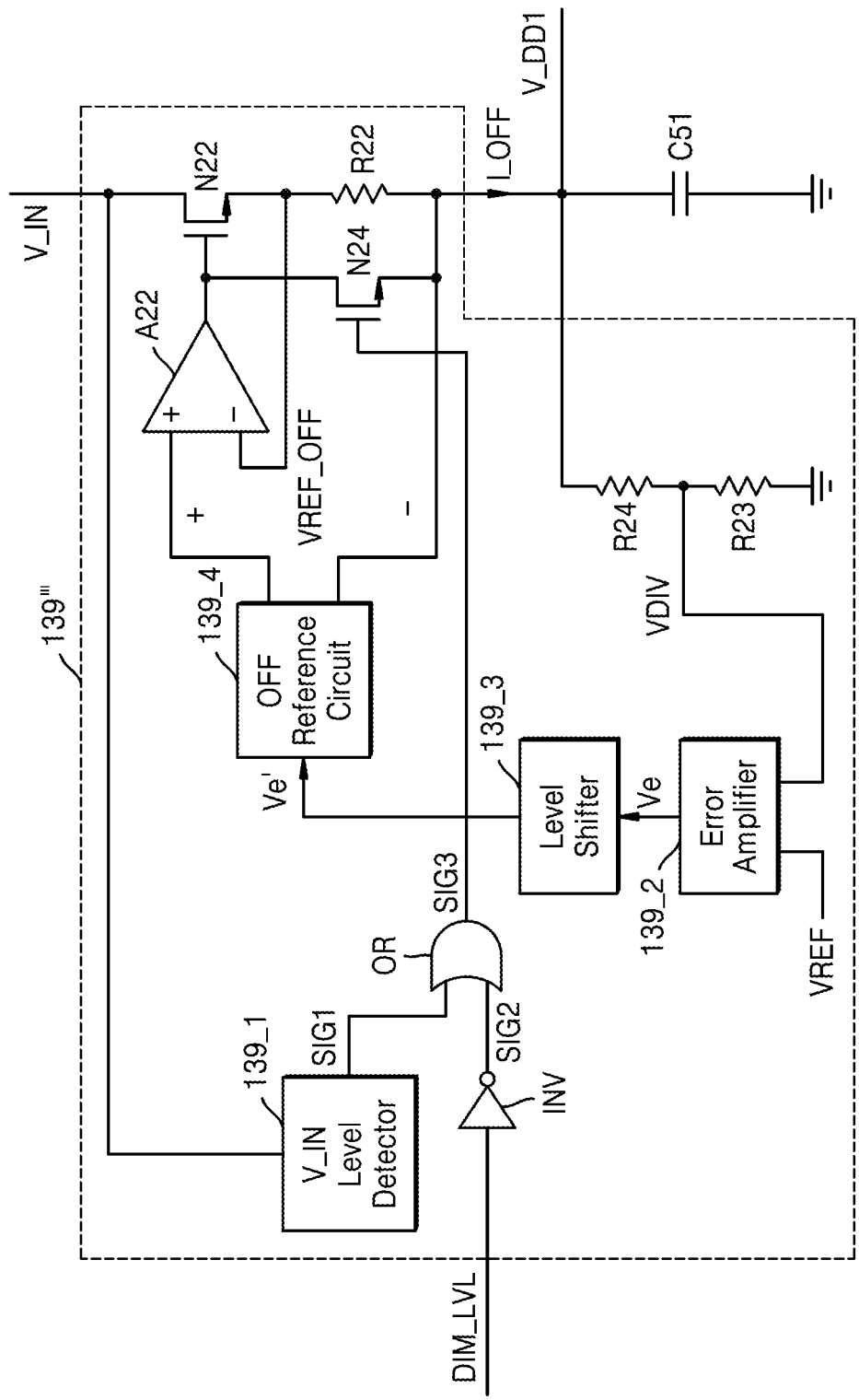
FIG. 16B is a diagram showing an example of a dimming-off current supply circuit of FIG. 16A according to an example embodiment of the disclosure.

FIG. 16A is a diagram showing an example of the power delivery circuit 130 of FIG. 2 according to an example embodiment of the disclosure, and FIG. 16B is a diagram showing an example of a dimming off current supply circuit 139''' of FIG. 16A according to an example embodiment of the disclosure. In detail, a power delivery circuit 130''' of FIG. 16A includes the dimming off current supply circuit 139' that provides a current to a regulator circuit 132'' not only in the dimming off state, but also in a state in which the LED driving current I_LED is insufficient due to dimming control. Compared with the power delivery circuit 130'' of FIG. 12, the power delivery circuit 130''' of FIG. 16A may further include a dimming level detector 135 and may receive only the LED driving current I_LED (for example, from the LED driver 150a of FIG. 8A) based on the dimming level detector 135 and the dimming off current supply circuit 139'. In some embodiments, the dimming level detector 135 may be included in the dimming off current supply circuit 139'''. Hereinafter, it is assumed that the power delivery circuit 130''' of FIG. 16A receives the current I_LED from the LED driver 150*a* of FIG. 8A, and descriptions identical to those of FIG. 12 will be omitted.

Referring to FIG. 16A, the power delivery circuit 130''' may include the regulator circuit 132'', a converter circuit 134'', a dimming off detector 131', the dimming off current supply circuit 139''', and the dimming level detector 135. The dimming off current supply circuit 139''' may not receive the dimming off signal DIM_OFF, and thus the OFF current I_OFF may be supplied to the regulator circuit 132'' regardless of whether the dimming off signal DIM_OFF is activated.

The dimming off current supply circuit 139''' may provide a current corresponding to the supplementary current I_SP, as described below with reference to FIGS. 17A to 17C. The dimming level detector 135 may receive the second control signal CTR2 from the converter circuit 134'' and generate a dimming level signal DIM_LVL, and the dimming off current supply circuit 139' may receive the dimming level signal DIM_LVL may be received from the dimming level detector 135. In some embodiments, the dimming level detector 135 may receive the first control signal CTR1 and generate the dimming level signal DIM_LVL. When the second control signal CTR2 corresponds to a dimming level below a pre-defined dimming level, the dimming level detector 135 may provide an activated (e.g., high level) dimming level signal DIM_LVL to the dimming off current supply circuit 139'''. Otherwise, the dimming level detector 135 may provide a deactivated (e.g., low level) dimming level signal DIM_LVL to the dimming off current supply circuit 139'''.

Referring to FIG. 16B, when compared to the dimming off current supply circuit 139' of FIG. 14B, the dimming off current supply circuit 139''' of FIG. 16B may receive the dimming level signal DIM_LVL instead of the dimming off signal DIM_OFF and may include the same components as those of the dimming off current supply circuit 139' of FIG. 14B, wherein the like reference numerals denote the like elements for convenience of explanation. Hereinafter, descriptions identical to those of FIG. 14B will be omitted.

When a dimming level corresponding to the second control signal CTR2 is equal to or higher than a pre-defined dimming level (e.g., 90%), the dimming level detector 135 may provide a deactivated (e.g., low level) dimming level signal DIM_LVL. Therefore, by the turned-on NMOS transistor N24 and the turned-off NMOS transistor N22, the OFF current I_OFF may become approximately zero. On the other hand, when a dimming level corresponding to the second control signal CTR2 is lower than or equal to the pre-defined dimming level (e.g., 90%), the dimming level detector 135 may provide an activated (e.g., high level) dimming level signal DIM_LVL. Therefore, the OFF current I_OFF may be supplied to a node of the first positive supply voltage V_DD1 node according to the output SIG1 of the input voltage level detector 139_1.

In the negative feedback control system of FIG. 16B, the error amplifier 139_2 may output the output voltage Ve that is (e.g., linearly) proportional to a difference between two inputs VREF and VDIV. For example, the output voltage Ve may increase when the divided voltage VDIV is lower than the reference voltage VREF and may decrease when the divided voltage VDIV is higher than the reference voltage VREF. Under a full dimming (e.g., 100% dimming) condition that allow the LED driving current I_LED to be supplied at its maximum value, the first positive supply voltage V_DD1 may have a maximum value, and thus the output voltage Ve of the error amplifier 139_2 may be a minimum voltage Ve_min. In some embodiments, even when the output voltage Ve of the error amplifier 139_2 is the minimum output voltage Ve_min, a non-zero OFF current I_OFF may be generated.

As described above, the OFF current I_OFF may have a pulse waveform, thereby deteriorating characteristics such as electromagnetic interference (EMI). In some embodiments, even under such a full dimming condition, for a lighting apparatus (e.g., 100 of FIG. 2) to have excellent characteristics, the dimming off current supply circuit 139''' may receive the dimming level signal DIM_LVL that is deactivated (i.e., low level) when the dimming level is equal to or higher than a preset dimming level (e.g., 90%) and, as the NMOS transistor N22 of FIG. 16B is turned off, the OFF current I_OFF may become approximately zero. In some embodiments, under a full dimming condition in which the output voltage Ve of the error amplifier 139_2 becomes the minimum voltage Ve_min according to the circuit configuration of FIG. 16B, the dimming off current supply circuit 139''' of FIG. 16B may provide the OFF current I_OFF that is approximately zero, the dimming level detector 135 may be omitted, and the dimming level signal DIM_LVL may always maintain an activated state (e.g., high level).

As described above with reference to FIG. 4, the shunt regulator 132_2 of FIG. 4 needs to receive a current I_LED' greater than a load current (e.g., I_LOAD of FIG. 5A) to maintain the first positive supply voltage V_DD1 of a certain magnitude V_DD1_NOM. In an interval in which the LED driving current I_LED decreases (e.g., an interval in which the LED driving current I_LED following the input voltage V_IN as shown in FIG. 8B is approximately zero or the LED driving current I_LED is decreased due to the dimming signal DIM of FIG. 8A), capacitors (e.g., C51*a*, C51*b*, and C51*c* of FIGS. 5A to 5C) connected to a node from which the first positive supply voltage V_DD1 is output may supply a current to a load of the first positive supply voltage V_DD1. When the average current of the LED driving current I_LED is sufficiently greater than a current provided to the load of the first positive supply voltage V_DD1 and a capacitor value thereof is also sufficiently large, the first positive supply voltage V_DD1 supplied by the regulator circuit 132' may be maintained at the constant magnitude V_DD1_NOM.

When the magnitude of the LED driving current I_LED decreases due to the dimming signal DIM, an interval during which a capacitor supplies a current may be extended, and thus a voltage drop may occur at the first positive supply voltage V_DD1. When the dimming level is very low (e.g., 20%), the voltage drop of the first positive supply voltage V_DD1 may be more significant, and, as shown in FIG. 4, the first positive supply voltage V_DD1 may become a voltage lower than a voltage at which linear regulators 132_6 and 132_8 are capable of normally supplying second and third positive supply voltages V_DD2 and V_DD3. To resolve the problem, as described above with reference to FIG. 9, the current supply circuit 158 of FIG. 9 may provide the supplementary current I_SP. Meanwhile, the power delivery circuit 130''' of FIG. 16A may perform a function similar to that of the current supply circuit 158 of FIG. 9 when the dimming off signal DIM_OFF is deactivated, as described below with reference to FIGS. 17A to 17C.

Figure 17A:
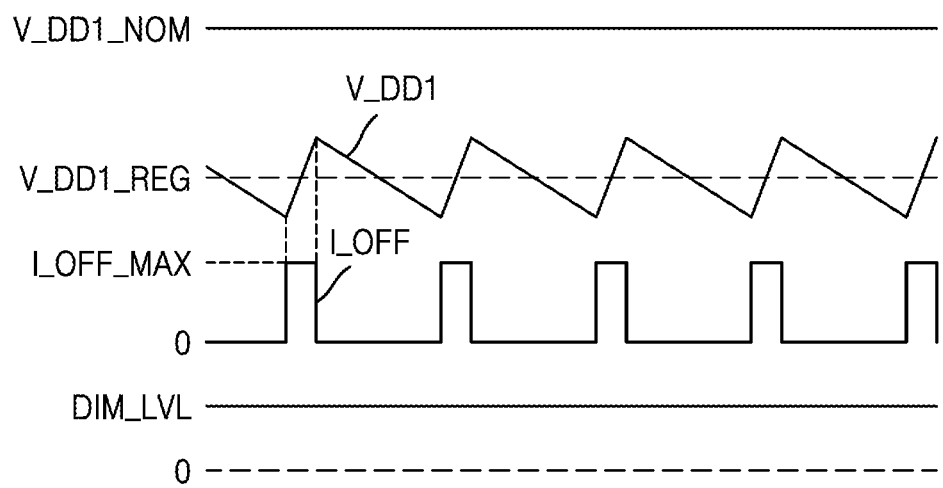
FIGS. 17A to 17C are diagrams showing examples of operations of a power delivery circuit of FIG. 16A and the dimming-off current supply circuit of FIG. 16B, according to example embodiments of the disclosure.
Figure 17B:
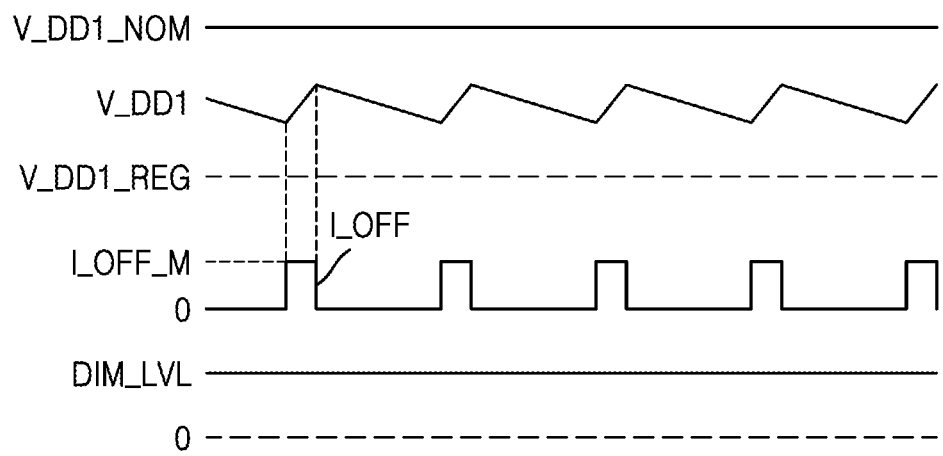
Figure 17C:
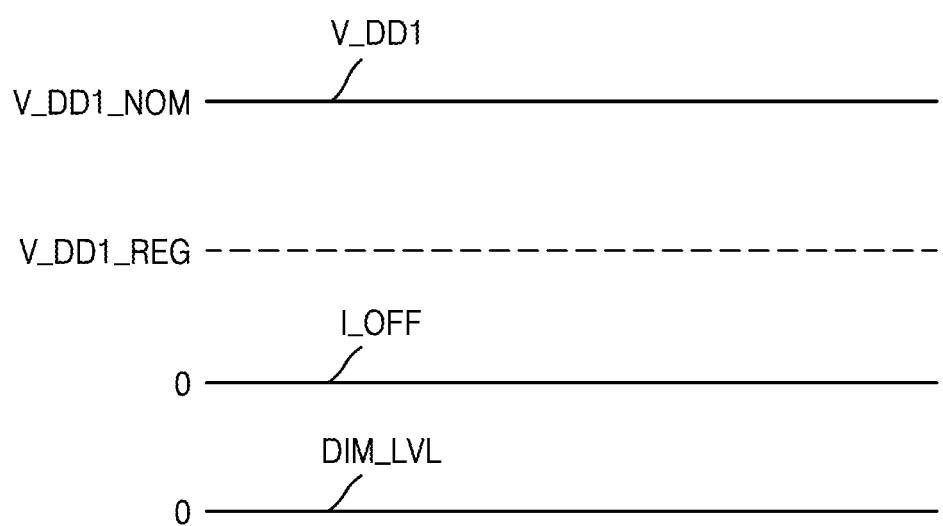

FIGS. 17A to 17C are diagrams showing examples of the operations of the power delivery circuit 130''' of FIG. 16A and the dimming off current supply circuit 139''' of FIG. 16B, according to example embodiments of the disclosure. In detail, FIGS. 17A to 17C show operations of the power delivery circuit 130''' and the dimming off current supply circuit 139''' according to dimming levels. For convenience of explanation, it is assumed that the OFF current I_OFF has a constant magnitude in an interval in which the input voltage V_IN is smaller than a preset voltage (e.g., VIN_H), unlike the waveform shown in FIG. 14A. Hereinafter, FIGS. 17A to 17C will be described with reference to FIGS. 16A and 16B.

Referring to FIG. 17A, when the dimming off signal DIM_OFF is activated, the LED driving current I_LED, which is approximately zero, may be supplied from an LED driver (e.g., 150a of FIG. 8A), and a shunt regulator (e.g., 132_2 of FIG. 4) of the regulator circuit 132″ may be turned off. As shown in FIG. 17A, due to the OFF current I_OFF having a pulse waveform, the first positive supply voltage V_DD1 may increase during an interval at which the OFF current I_OFF is supplied and decrease during an interval in which the OFF current I_OFF is approximately zero. In this case, an average value V_DD1_REG of the first positive supply voltage V_DD1 may be calculated as shown in [Equation 9] through a negative feedback control of the dimming off current supply circuit 139‴ of FIG. 16B. Meanwhile, the maximum value I_OFF_MAX of the OFF current I_OFF may be determined through a feedback control, such that an average value of the OFF current I_OFF coincides with a current provided to the load of the first positive supply voltage V_DD1. The capacitance of the capacitor C51 may be determined to be equal to or greater than a capacitance for normally operating linear regulators (e.g., 132_6 and 132_8 of FIG. 4) of the regulator circuit 132″ even when the first positive supply voltage V_DD1 becomes minimum.

Referring to FIG. 17B, when the dimming off signal DIM_OFF is deactivated but, due to a low dimming level (e.g., 30%), an average value of the LED driving current I_LED is smaller than a current provided to the load of the first positive supply voltage V_DD1, the dimming off current supply circuit 139‴ may perform a feedback control, such that a sum of the average I_OFF_AVG of the OFF current I_OFF and an average I_LED_AVG of the current I_LED of the LED driver coincides with the current provided to the load of the first positive supply voltage V_DD1. In other words, a maximum value I_OFF_M of the OFF current I_OFF may be determined as a value, such that "I_OFF_AVG+I_LED_AVG" coincides with the current provided to the load of the first positive supply voltage V_DD1.

Referring to FIG. 17C, when the dimming level is equal to or higher than a pre-defined dimming level (e.g., 90%), according to a deactivated (i.e., low level) dimming level signal DIM_LVL, the NMOS transistor N22 may be turned off, and the OFF current I_OFF may be approximately zero. However, due to a very high dimming level, an average current of the current I_LED received from an LED driver (e.g., 150a of FIG. 8A) may be much greater than a load current I_LOAD, and thus a shunt regulator (e.g., 132_2 of FIG. 4) of the regulator circuit 132″ of FIG. 16A may operate normally, and the first positive supply voltage V_DD1 may maintain the constant magnitude V_DD1_NOM.

Figure 18A:
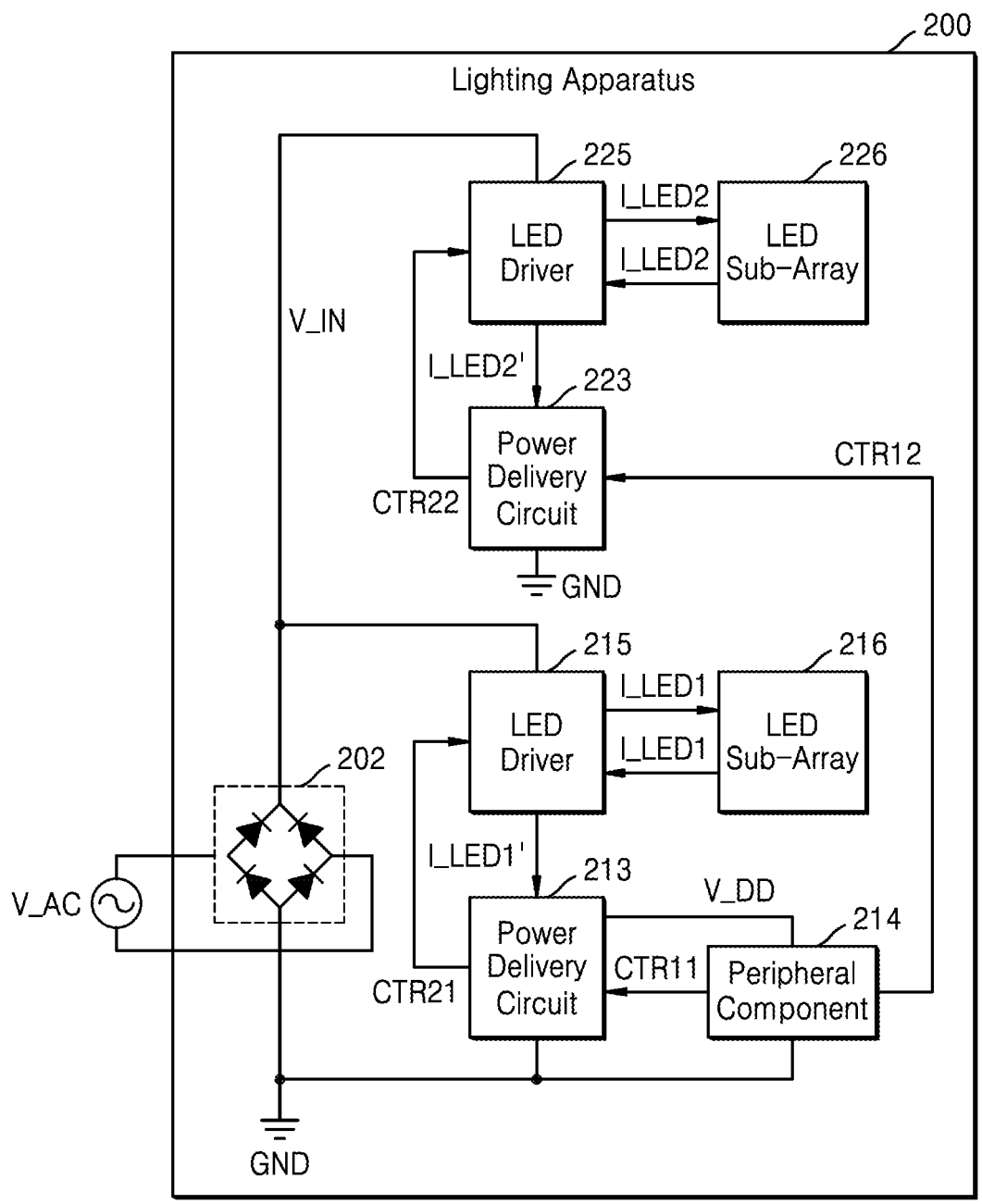
FIGS. 18A and 18B are block diagrams showing examples of a lighting apparatus according to example embodiments of the disclosure.
Figure 18B:
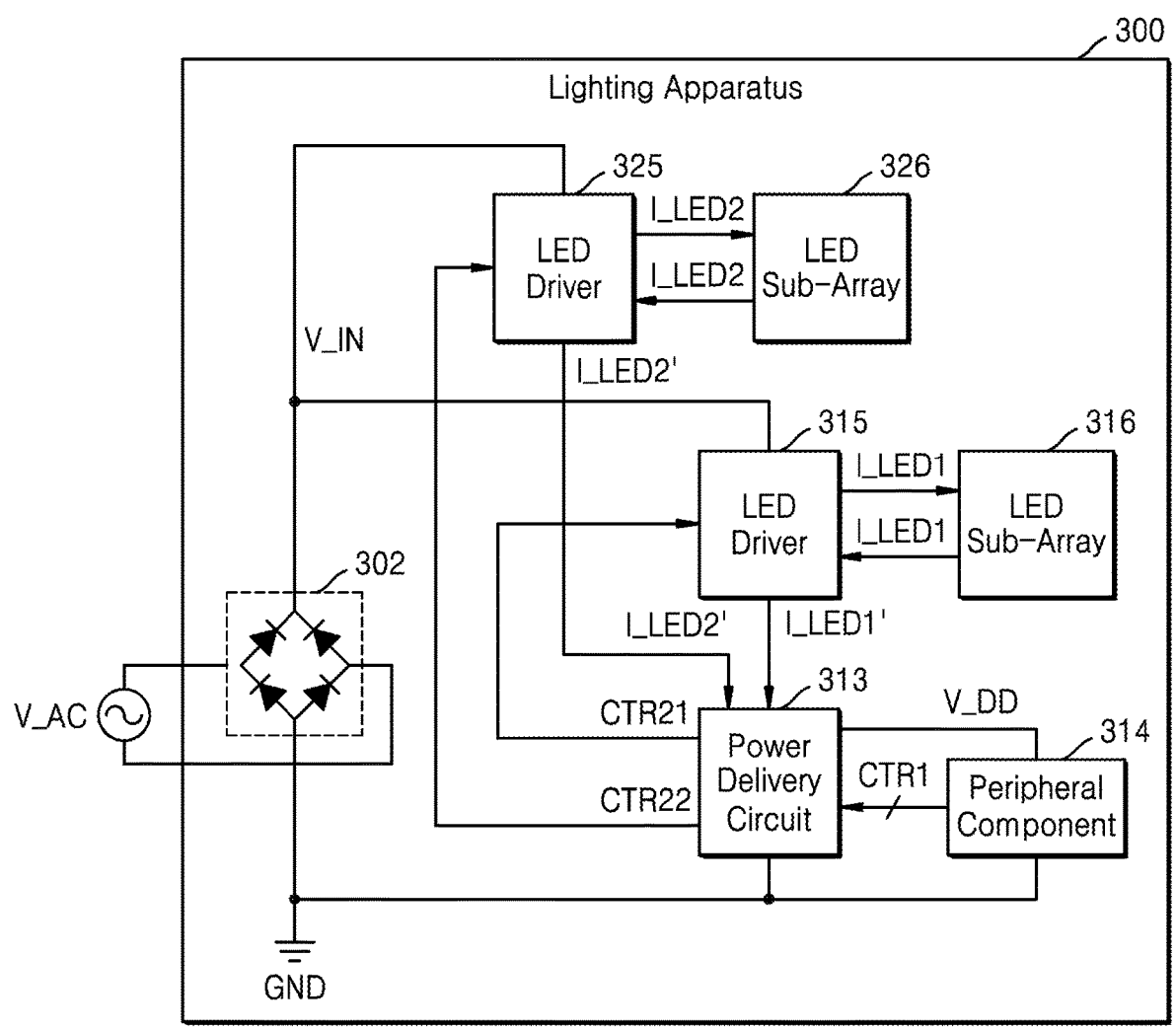

FIGS. 18A and 18B are block diagrams showing examples of a lighting apparatus according to example embodiments of the disclosure. In detail, FIGS. 18A and 18B show example lighting apparatuses 200 and 300 each including a plurality of LED sub-arrays including LEDs having different color temperatures. Hereinafter, redundant descriptions of FIGS. 18A and 18B will be omitted.

Referring to FIG. 18A, a lighting apparatus 200 may receive the AC voltage V_AC and may include a full-wave rectifier 202, first and second power delivery circuits 213 and 223, a peripheral component 214, first and second LED driver 215 and 225, and first and second LED sub-arrays 216 and 226. The first and second LED sub-arrays 216 and 226 may each include LEDs having different color temperatures. For example, a first LED sub-array 216 may include LEDs having a color temperature of about 2500K, whereas a second LED sub-array 226 may include LEDs having a color temperature of about 6500K. The lighting apparatus 200 may adjust a first LED driving current I_LED1 provided to the first LED sub-array 216 and a second LED driving current I_LED2 provided to the second LED sub-array 226, thereby controlling the color temperature of light emitted by the lighting apparatus 200.

As shown in FIG. 18A, to adjust the first LED driving current I_LED1 and the second LED driving current I_LED2 provided to the first LED sub-array 216 and the second LED sub-array 226, respectively, the lighting apparatus 200 may include a first power delivery circuit 213 and a second power delivery circuit 223, respectively. The first power delivery circuit 213 may receive at least a part I_LED1' of the first LED driving current I_LED1 from a first LED driver 215 and generate the positive supply voltage V_DD. For example, the first power delivery circuit 213 and the second power delivery circuit 223 may have the same or similar structure as that of the power delivery circuit 130' of FIG. 3.

The peripheral component 214 may generate first control signals CTR11 and CTR12 to adjust the intensity of light emitted by the first LED sub-array 216 and the second LED sub-array 226, a first control signal CTR11 may be transmitted to the first power delivery circuit 213, and a first control signal CTR12 may be transmitted to the second power delivery circuit 223. The first power delivery circuit 213 and the second power delivery circuit 223 may generate second control signals CTR21 and CTR22 by converting the first control signals CTR11 and CTR12 and may provide the second control signals CTR21 and CTR22 to the first LED driver 215 and the second LED driver 225, respectively.

Referring to FIG. 18B, a lighting apparatus 300 may receive the AC voltage V_AC and may include a full-wave rectifier 302, a power delivery circuit 313, a peripheral component 314, first and second LED driver 315 and 325, and first and second LED sub-arrays 316 and 326. Compared with the lighting apparatus 200 of FIG. 18A, the lighting apparatus 300 of FIG. 18B may include one power delivery circuit 313. As shown in FIG. 18B, the power delivery circuit 313 may receive both at least a part I_LED1' of the first LED driving current I_LED1 and at least a part I_LED2' of the second LED driving current I_LED2 and generate the positive supply voltage V_DD from the part I_LED1' and the part I_LED2'. In some embodiments, the power delivery circuit 313 may receive only a current (e.g., I_LED1' or I_LED2') corresponding to one LED sub-array 316, as shown in FIG. 18B. Also, the power delivery circuit 313 may generate two or more second control signals CTR21 and CTR22 from one or more first control signal CTR1. For example, as shown in FIG. 18B, the power delivery circuit 313 may provide the second control signals CTR21 and CTR22 to the first LED driver 315 and the second LED driver 325, respectively, and the first LED driving current I_LED1 and the second LED driving current I_LED2 may be adjusted according to the second control signals CTR21 and CTR22, respectively.

Although the lighting apparatuses 200 and 300 including two LED sub-arrays are shown in FIGS. 18A and 18B, according to example embodiments of the disclosure, a lighting apparatus may include three or more LED sub-arrays. For example, a lighting apparatus may include three LED sub-arrays each including red LEDs, green LEDs, and blue LEDs, and an LED driving currents supplied to each of the three LED sub-arrays may be independently controlled according to a control signal. Also, combinations of power delivery circuits, LED drivers, and LED sub-arrays shown in FIGS. 18A and 18B are merely examples, and it will be understood that lighting apparatuses including different combinations from those of FIGS. 18A and 18B are also included in the scope of the technical idea of the disclosure.

Figure 19:
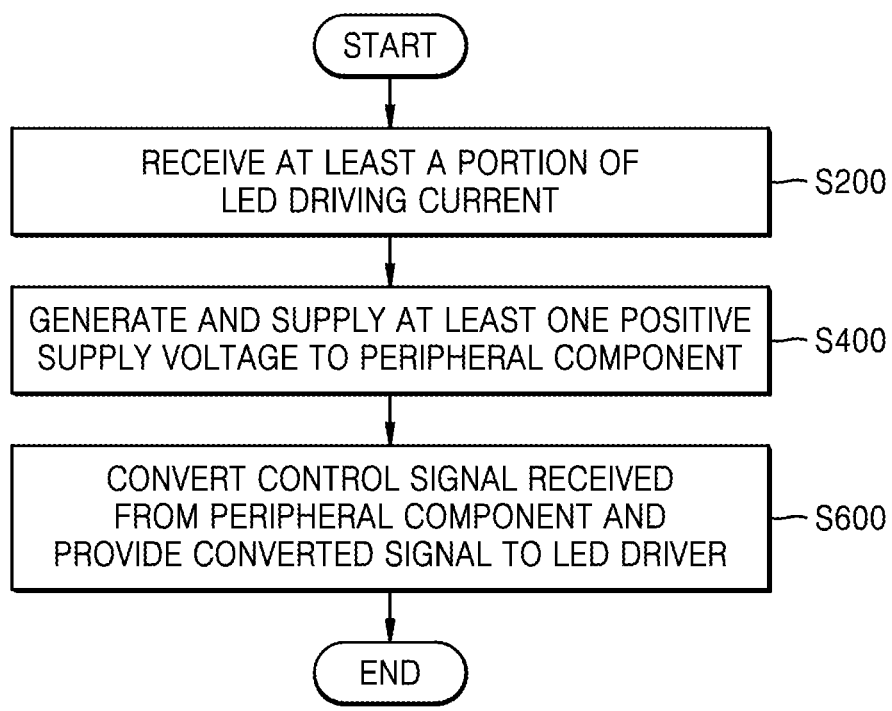
FIG. 19 is a flowchart of a method of supplying power to a peripheral component in a lighting apparatus including LEDs according to an example embodiment of the disclosure.

FIG. 19 is a flowchart of a method of supplying power to a peripheral component in a lighting apparatus including LEDs according to an example embodiment of the disclosure. For example, the method of FIG. 19 may be performed by the power delivery circuit 130 of FIG. 2. Referring to FIG. 19, an operating method of a lighting apparatus may include operations S200, S400, and S600, and FIG. 19 will be described below with reference to FIG. 2.

In operation S200, an operation for receiving at least a part of an LED driving current may be performed. For example, the power delivery circuit 130 may receive at least the part I_LED' of the LED driving current I_LED passing through the LED array 160 from the LED driver 150.

In operation S400, an operation for generating at least one positive supply voltage and supplying the same to a peripheral component may be performed. For example, the power delivery circuit 130 may generate the positive supply voltage V_DD from the part I_LED' provided from the LED driver 150. Depending on the peripheral component 140, the power delivery circuit 130 may generate a plurality of positive supply voltages. The peripheral component 140 may be operated by a positive supply voltage provided from the power delivery circuit 130.

In operation S600, an operation for converting a control signal received from a peripheral component and providing a converted signal to an LED driver may be performed. For example, the power delivery circuit 130 may receive the first control signal CTR1 for controlling the lighting apparatus 100 from the peripheral component 140 and generate the second control signal CTR2 for controlling the LED driving current I_LED by converting the first control signal CTR1. In some embodiments, the power delivery circuit 130 may convert the first control signal CTR1 having a variable voltage to the second control signal CTR2 having a variable voltage or a variable current or to the second control signal CTR2 having a non-electrical variable optical signal. The LED driver 150 may provide an adjusted LED driving current I_LED to the LED array 160 in response to the second control signal CTR2.

Figure 20A:
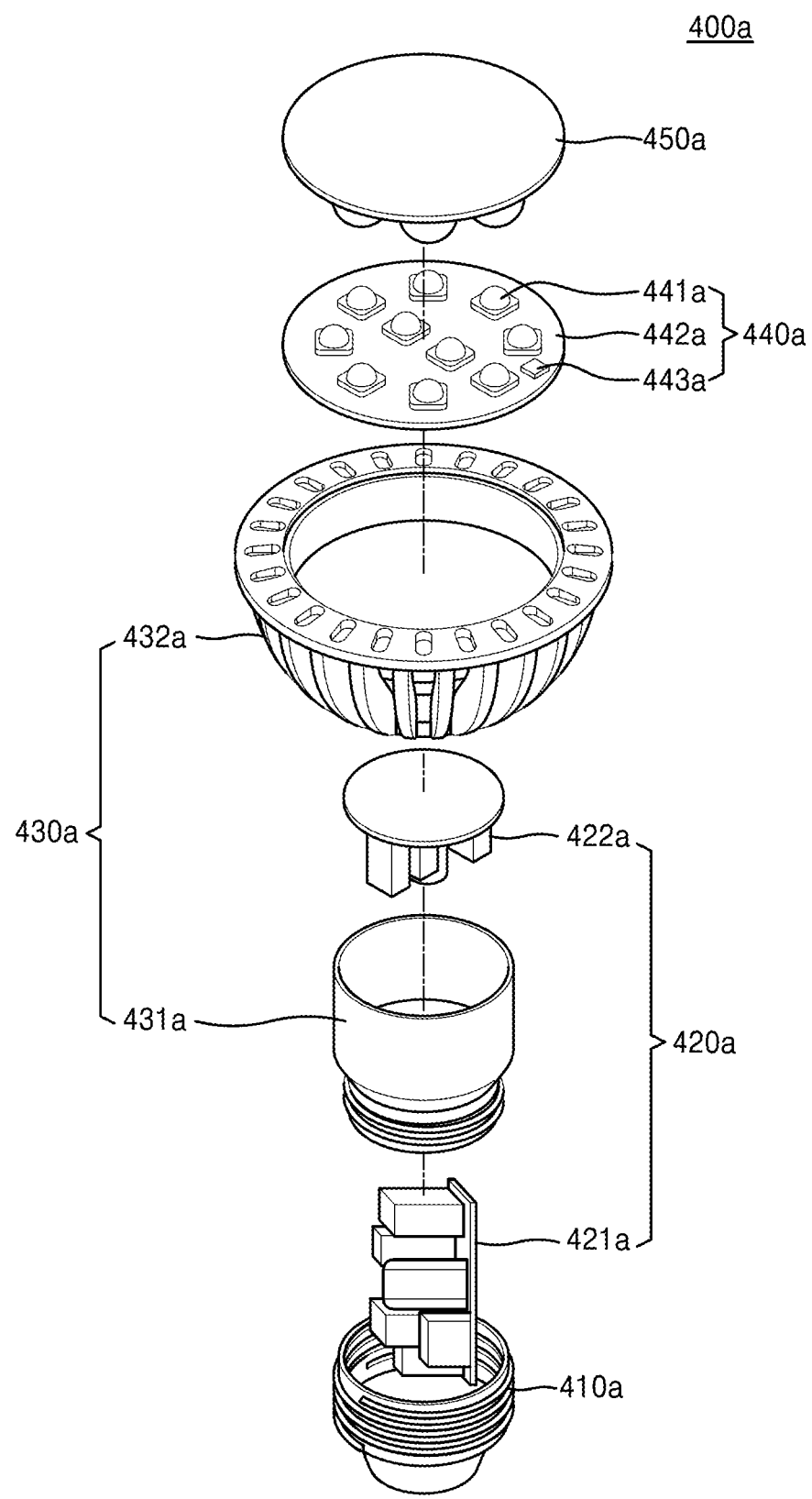
FIGS. 20A and 20B are diagrams showing lighting apparatuses according to example embodiments of the disclosure.
Figure 20B:
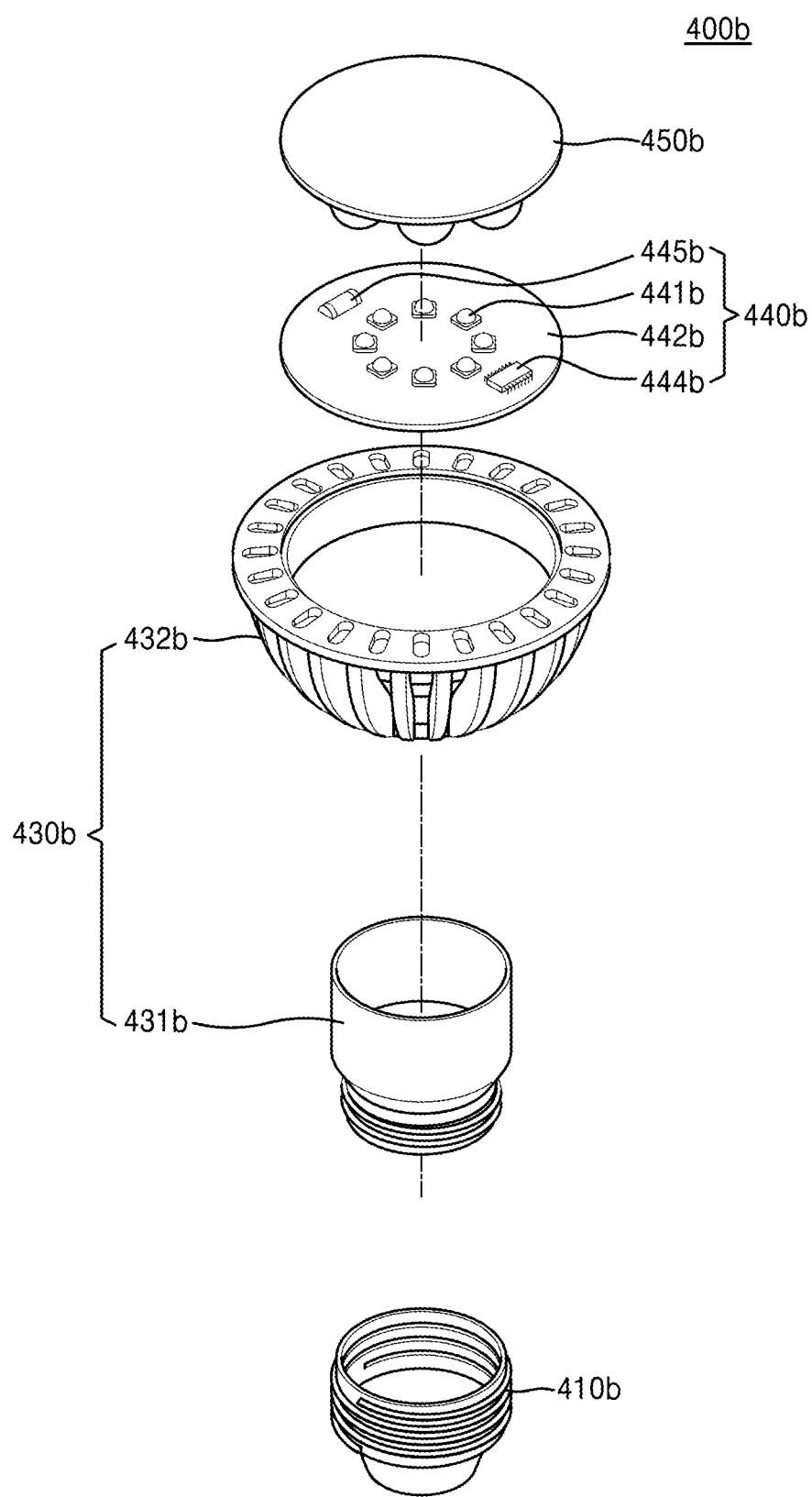

FIGS. 20A and 20B are diagrams showing lighting apparatuses 400a and 400b according to example embodiments of the disclosure. Hereinafter, redundant descriptions of FIGS. 20A and 20B will be omitted.

Referring to FIG. 20A, a lighting apparatus 400a may include a socket 410a, a power supply unit 420a, a heat dissipating unit 430a, a light source 440a, and an optical unit 450a.

The socket 410a may be configured to be replaceable with a legacy lighting apparatus. Power supplied to the lighting apparatus 400a may be applied through the socket 410a. For example, an AC voltage may be applied to the socket 410a. As shown in FIG. 20A, the power supply unit 420a may be assembled as separate units, that is, a first power supply unit 421a and a second power supply unit 422a. For example, the first power supply unit 421a may include the full-wave rectifier 120 of FIG. 2, and the second power supply unit 422a may include at least a portion of the LED driver 150. As described above with reference to FIGS. 1A and 1B, when components (e.g., 11a and 13a of FIG. 1a or 13b of FIG. 1b) that generate a positive supply voltage for components included in the lighting apparatus 400a are included, the volume of the power supply unit 420a may increase, and the characteristics of the lighting apparatus 400a may be deteriorated due to heat generated by the power supply unit 420a. On the other hand, as described above, according to example embodiments of the disclosure, in case of generating a positive supply voltage for a peripheral component from at least a part of the LED driving current, (e.g., by omitting the first power supply unit 421a or the second power supply unit 422a), not only the volume of the power supply unit 420a may be reduced, but also the deterioration of characteristics of the lighting apparatus 400a due to heat generation may be resolved.

The heat dissipating unit 430a may include an internal heat dissipating unit 431a and an external heat dissipating unit 432a, and the internal heat dissipating unit 431a may be directly connected to the light source 440a and/or the power supply unit 420a, thereby transmitting heat to the external heat dissipating unit 432a. Due to reduced heat generation according to an example embodiment of the disclosure, the internal heat dissipating unit 431a and the external heat dissipating unit 432a may be downsized or at least partially removed. The optical unit 450a may include an internal optical unit (not shown) and an external optical unit (not shown), and may be configured to evenly distribute light emitted by the light source 440a.

The light source 440a may receive power from the power supply unit 420a and emit light to the optical unit 450a. The light source 440a may include a plurality of LED packages 441a, a circuit board 442a, and at least one integrated circuit package 443a. The at least one integrated circuit package 443a may include at least some of a power delivery circuit, a peripheral component, and an LED driver according to example embodiments of the disclosure.

The plurality of LED packages 441a may include LED packages of the same type that emit light of the same wavelength. Alternatively, the plurality of LED packages 441a may include LED packages of different types that emit light of different wavelengths. For example, the LED package 441a may be configured to include at least one of a light emitting device that emits white light by combining yellow, green, red, or orange phosphors with a blue light emitting device and a light emitting device that emits at least one of a purple light, a blue light, a green light, a red light, or an infrared light. In this case, the lighting apparatus 400a may adjust the color rendering CRI to the level of sunlight in a sodium (Na) lamp, may generate white light of various color temperatures from a candlelight level (1500K) to a blue sky level (12000K), and, as occasions demand, may adjust color of light according to an ambient mood or an emotion by generating a purple, blue, green, red, or orange visible ray or an infrared ray. Also, the lighting apparatus 400a may generate light of a special wavelengths that may promote plant growth.

Referring to FIG. 20B, a lighting apparatus 400b may include a socket 410b, a heat dissipating unit 430b, a light source 440b, and an optical unit 450b. Compared with the lighting apparatus 400a of FIG. 20A, the lighting apparatus 400b of FIG. 20B may include the light source 440b implemented as a driver on board (DOB). As shown in FIG. 20B, the light source 440b may include a circuit board 442b and includes at least one LED package 441b, an integrated circuit package 444b, and a passive device 445b mounted on the circuit board 442*b*. The DOB is a structure that may be efficient in terms of the productivity and the weight of the lighting apparatus 400*b*, and a circuit for supplying power to a peripheral component according to an example embodiment of the disclosure described below may facilitate the implementation of the DOB.

According to the example embodiments of the disclosure described above, a circuit for supplying power to peripheral components included in the lighting apparatus 400*b* provides reduced power consumption and reduced space occupancy, and thus the circuit may be mounted on the circuit board 442*b* of the DOB. In some embodiments, a peripheral component and a circuit for supplying power to the peripheral component may be included in the same integrated circuit package 444*b* as shown in FIG. 20B. In some embodiments, the light source 440*b* may include two or more integrated circuit packages, and a peripheral component and a circuit for supplying power to the peripheral component may be included in different integrated circuit packages, respectively. Also, according to example embodiments of the disclosure, the size of the passive device 445*b* mounted on the circuit board 442*b* may also be reduced.

Although FIG. 20B shows that the heat dissipating unit 430*b* includes the internal heat dissipating unit 431*b* and the external heat dissipating unit 432*b* separated from each other, in some embodiments, the lighting apparatus 400*b* may include an integrated heat dissipating unit, and, in some other embodiments, the lighting apparatus 400*b* may not include a heat dissipating unit. In other words, according to example embodiments of the disclosure, power consumption of the lighting apparatus 400*b* may be reduced, and thus the heat dissipating unit 430*b* may be downsized or omitted.

FIG. 21 is a diagram showing a home-network including a lighting apparatus 520 according to an example embodiment of the disclosure. Other devices, such as a wall switch 530, a wireless router 540, a household electronics 570, a door lock 580, and a garage door 590, may be communicate with one another via a wireless communication hub 500 by utilizing a home wireless communication protocol (e.g., ZigBee, Wi-Fi, Bluetooth, etc.). Also, a mobile phone 550 or the like may access the wireless communication hub 500 via a network 560 like the Internet. The lighting apparatus 520 may include a peripheral component for accessing the wireless communication hub 500, and the peripheral component may receive a positive supply voltage from a power delivery circuit according to an example embodiment of the disclosure. Also, the peripheral component included in the lighting apparatus 520 may support the Internet of Things (IoT).

The brightness of light emitted by the lighting apparatus 520 may be automatically adjusted according to operation states of a bedroom, a living room, an entrance hall, a warehouse, a home appliance, and the surrounding environment/situation, or according to a user's control. For example, the brightness of light emitted by the lighting apparatus 520 may be automatically adjusted according to the type of a TV program broadcasted through a TV 510 or the screen brightness of the TV 510. When human dramas are being played back and a cozy atmosphere is needed, the color temperature of light may be lowered and the color of light may be adjusted therefor. On the contrary, in case of a comedy program, the color temperature of light may be increased and the light may be adjusted to blue-based white light.

As described above, example embodiments have been disclosed in the drawings and specification. Although embodiments have been described herein using specific terminology, it is understood that they have been used only for purposes of describing the disclosure and not for limiting the scope of the disclosure as defined in the claims. Therefore, one of ordinary skill in the art will appreciate that various modifications and equivalent embodiments are possible without departing from the scope of the disclosure. Accordingly, the true scope of protection of the disclosure should be determined by the technical idea of the appended claims.

The invention claimed is:

1. An apparatus comprising:
a regulator circuit configured to generate at least one positive supply voltage from at least a portion of a light-emitting diode (LED) driving current passed through an LED to supply power to a component included in a lighting apparatus; and
a converter circuit configured to receive a first control signal from the component and output a second control signal for controlling the LED driving current by converting the first control signal.

2. The apparatus of claim 1, wherein the regulator circuit comprises a shunt regulator configured to generate a first positive supply voltage from the at least part of the LED driving current.

3. The apparatus of claim 2, further comprising:
a dimming-off detector configured to detect a dimming-off state based on the first control signal or the second control signal; and
a current supply circuit configured to provide, to the regulator circuit, a current generated from a full-wave rectified input voltage from an alternating current (AC) voltage, according to the detected dimming-off state.

4. The apparatus of claim 3, wherein, according to the detected dimming-off state, the shunt regulator is turned off and a current provided by the current supply circuit is provided to a node for outputting the first positive supply voltage.

5. The apparatus of claim 2, further comprising:
a dimming level detector configured to detect a dimming level based on the first control signal or the second control signal; and
a current supply circuit configured to provide, to the regulator circuit, a current generated from a full-wave rectified input voltage from an alternating current (AC) voltage, according to the detected dimming level.

6. The apparatus of claim 2, wherein the regulator circuit comprises a linear regulator configured to generate a second positive supply voltage from the first positive supply voltage.

7. The apparatus of claim 6, wherein the regulator circuit comprises a reference circuit configured to generate, from the first positive supply voltage, a reference signal provided to at least one of the shunt regulator and the linear regulator.

8. The apparatus of claim 1, wherein the converter circuit is further configured to convert the first control signal having a variable voltage into the second control signal having one of a variable current, a variable voltage, and a variable light intensity.

9. The apparatus of claim 1, wherein the converter circuit is further configured to output the second control signal at a certain level when the first control signal exceeds a preset upper bound.

10. The apparatus of claim 1, wherein the converter circuit is further configured to output the second control signal at a certain level when the first control signal is below a preset lower bound.

11. The apparatus of claim 1, further comprising:
an LED driver configured to generate, from an input voltage, the LED driving current having a magnitude that follows the magnitude of the input voltage full-wave rectified from an AC voltage and to adjust the magnitude of the LED driving current based on the second control signal.

12. The apparatus of claim 11, wherein the LED driver comprises a current supply circuit configured to provide, to the regulator circuit, a supplementary current generated from the input voltage, based on the second control signal.

13. The apparatus of claim 12, wherein the LED driver further includes an operation interval selection circuit configured to generate an operation interval signal based on at least one of the input voltage and the LED driving current, and
the current supply circuit outputs the supplementary current in response to the activated operation interval signal.

14. The apparatus of claim 1, further comprising:
the component configured to receive power from the at least one positive supply voltage and to generate the first control signal from an external signal received from the outside of the lighting apparatus.

15. A lighting apparatus configured to receive an alternating current (AC) voltage from the outside, the lighting apparatus comprising:
an LED array comprising at least one LED;
an LED driver configured to provide an LED driving current to the LED array;
a regulator circuit configured to generate at least one positive supply voltage from at least a portion of the LED driving current passed through the LED array; and
a component comprising a circuit that is configured to receive power from the at least one positive supply voltage;
wherein:
the component is configured to generate a first control signal for controlling the lighting apparatus based on an external signal input from the outside of the lighting apparatus,
the lighting apparatus further comprises a converter circuit configured to output a second control signal for controlling the LED driving current by converting the first control signal, and
the LED driver is further configured to adjust a magnitude of the LED driving current based on the second control signal.

16. The lighting apparatus of claim 15, wherein
the LED array comprises a plurality of LED sub-arrays including LEDs of different color temperatures, and
the LED driver is further configured to adjust, based on the second control signal, the magnitude of the LED driving current supplied to each of the plurality of LED sub-arrays.

17. The lighting apparatus of claim 15, wherein the component comprises an interface circuit configured to receive the external signal through a communication channel.

18. The lighting apparatus of claim 15, wherein the component comprises a sensor configured to obtain the external signal from an environment outside the lighting apparatus.

* * * * *